(12) United States Patent
Claussen et al.

(10) Patent No.: US 11,491,504 B2
(45) Date of Patent: Nov. 8, 2022

(54) SPRAYER APPARATUS AND SYSTEMS

(71) Applicant: Claussen Technology, LLC, Naples, FL (US)

(72) Inventors: Steven W. Claussen, Glenwood, MN (US); Justin D. Buetow, Hutchinson, MN (US); John P. Kennedy, Willmar, MN (US)

(73) Assignee: Claussen Technology, LLC, Naples, FL (US)

( * ) Notice: Subject to any disclaimer, the term of this patent is extended or adjusted under 35 U.S.C. 154(b) by 619 days.

(21) Appl. No.: 15/937,492

(22) Filed: Mar. 27, 2018

(65) Prior Publication Data
US 2018/0281010 A1 Oct. 4, 2018

Related U.S. Application Data

(63) Continuation of application No. 14/928,593, filed on Oct. 30, 2015, now Pat. No. 9,925,554.

(60) Provisional application No. 62/073,639, filed on Oct. 31, 2014.

(51) Int. Cl.
| B05B 15/65 | (2018.01) |
| B05B 13/00 | (2006.01) |
| B05B 1/20 | (2006.01) |
| A01M 7/00 | (2006.01) |
| B05B 12/36 | (2018.01) |

(52) U.S. Cl.
CPC .......... B05B 15/65 (2018.02); A01M 7/0042 (2013.01); A01M 7/0064 (2013.01); B05B 1/20 (2013.01); B05B 12/36 (2018.02); B05B 13/005 (2013.01)

(58) Field of Classification Search
CPC ....... B05B 15/065; B05B 1/20; B05B 13/005; A01M 7/0042; A01M 7/0064
USPC ......................................................... 239/164
See application file for complete search history.

(56) References Cited

U.S. PATENT DOCUMENTS

| 556,447 | A | | 3/1896 | Van Deusen | |
| 1,218,326 | A | * | 3/1917 | Sheridan | ............ A01G 13/0281 47/21.1 |
| 1,527,669 | A | | 2/1925 | Camp | |
| 1,669,435 | A | | 5/1928 | Wheeler | |
| 2,024,374 | A | * | 12/1935 | Langebrake | ......... A01G 25/095 239/737 |
| 2,641,505 | A | | 6/1953 | Valois | |

(Continued)

FOREIGN PATENT DOCUMENTS

| CA | 689054 | 6/1964 |
| FR | 1314571 A | 1/1963 |

OTHER PUBLICATIONS

"94-95" catalog illustrating "Hose Shank Nozzle Bodies and Vari-S-pacing Clamps," p. 61; Custom Ag Products, Inc., Benson, MN; 1 page.

(Continued)

Primary Examiner — Chee-Chong Lee
(74) Attorney, Agent, or Firm — Mueting Raasch Group

(57) ABSTRACT

Sprayer apparatus for use with an elongate boom may be configured to spray a liquid onto foliage on a ground surface. The sprayer apparatus may include a spray boom, a spray hood coupled to the spray boom, an extension member coupled to the spray boom, and a mounting apparatus coupled to the extension member. The mounting apparatus may be couplable to the elongate boom to support the spray boom and the spray hood above the ground surface.

8 Claims, 15 Drawing Sheets

(56) References Cited

U.S. PATENT DOCUMENTS

| | | | |
|---|---|---|---|
| 2,879,945 A * | 3/1959 | Johnson | A01G 25/095 |
| | | | 239/739 |
| 3,038,665 A | 6/1962 | Doerr | |
| 3,228,144 A * | 1/1966 | Homan | A01M 7/0064 |
| | | | 47/58.1 R |
| 3,395,485 A * | 8/1968 | Rooklidge | A01G 13/025 |
| | | | 47/23.2 |
| 4,074,856 A * | 2/1978 | Williams | A01G 9/247 |
| | | | 239/1 |
| 4,161,322 A | 7/1979 | Ekeborg | |
| 4,168,086 A | 9/1979 | Dick et al. | |
| 4,274,589 A | 6/1981 | Jones | |
| 4,379,522 A | 4/1983 | Elliott et al. | |
| 4,441,655 A | 4/1984 | Blumhardt | |
| 4,456,180 A | 6/1984 | Lury | |
| 4,519,723 A | 5/1985 | Kusmierz | |
| 4,521,988 A * | 6/1985 | Thacker | A01M 7/0064 |
| | | | 47/1.7 |
| 4,634,051 A | 1/1987 | Dudley | |
| 4,711,398 A | 12/1987 | Ganderton et al. | |
| 4,736,888 A | 4/1988 | Fasnacht | |
| 4,947,581 A | 8/1990 | Claussen et al. | |
| 5,012,608 A | 5/1991 | Brown | |
| 5,069,090 A | 12/1991 | Clark | |
| 5,155,933 A | 10/1992 | Claussen et al. | |
| 5,156,338 A | 10/1992 | Borland et al. | |
| 5,248,090 A | 9/1993 | Williamson | |
| 5,371,969 A | 12/1994 | Claussen et al. | |
| D356,629 S | 3/1995 | Claussen et al. | |
| 5,398,874 A | 3/1995 | Dailey | |
| 5,520,335 A * | 5/1996 | Claussen | A01M 7/0064 |
| | | | 239/104 |
| 5,526,605 A | 6/1996 | O'Dougherty | |
| D372,298 S | 7/1996 | Claussen et al. | |
| 6,047,901 A | 4/2000 | Pederson et al. | |
| 6,334,578 B1 | 1/2002 | House | |
| 6,705,546 B2 | 3/2004 | Bosch | |
| D669,966 S | 10/2012 | Claussen | |
| 8,657,316 B1 | 2/2014 | Bowers | |
| 9,139,232 B1 | 9/2015 | De La Rosa et al. | |
| 2002/0157891 A1 | 10/2002 | Hurlburt | |
| 2005/0045395 A1 | 3/2005 | Boden | |
| 2009/0044998 A1 | 2/2009 | Schmidt | |
| 2009/0241688 A1 | 10/2009 | Reichel | |
| 2013/0001320 A1 | 1/2013 | Claussen | |
| 2015/0174958 A1 | 6/2015 | Riley | |

OTHER PUBLICATIONS

SPK645 Self-Propelled Retrofit Broadcast Hoods—Youtube.pdf [at 1:23] [Nov. 4, 2013] [ONLINE] retrieved Feb. 1, 2016], <URL:https://www.youtube.com/watch?v=pe-Bjysn86s>.
U.S. Appl. No. 29/506,405, filed Oct. 15, 2014, Claussen.
U.S. Appl. No. 29/461,212, filed Jul. 19, 2013, Claussen.

* cited by examiner

SPRAYER APPARATUS AND SYSTEMS

This application is a continuation application of U.S. patent application Ser. No. 14/928,593, filed on Oct. 30, 2015, which claims the benefit of U.S. Provisional Patent Application Ser. No. 62/073,639 filed on Oct. 31, 2014, all of which are incorporated by reference herein in their entireties.

The present disclosure relates to sprayer apparatus and systems for use with an elongate boom to spray a liquid over a ground surface.

SUMMARY

The exemplary sprayer apparatus and systems described herein may be configured to retrofit an elongate boom (e.g., an elongate boom used and/or towed by a tractor) for use with a plurality of spray hoods. The spray hoods may be configured to direct sprayed liquids towards a ground surface while minimizing drift of the sprayed liquids. The elongate booms may not be configured to use or hold spray hoods thereon, and thus, the sprayer apparatus and systems described herein may be configured to adapt, or retrofit, the elongate booms such that the spray hoods of the apparatus and systems may be used on the elongate booms. To perform such functionality, the sprayer apparatus may include mounting apparatus, extension members, spray booms, etc. to retrofit, or modify, the elongate booms such that the elongate booms can support the spray hoods. The exemplary sprayer apparatus and/or systems may be described as being part of a kit configured to retrofit the elongate booms. In other words, the elements, components, and/or portions of the exemplary sprayer apparatus and/or systems may be combined into a package that may be used to increase the functionality of elongate booms (e.g., by adding spray hoods to the booms, which minimize drift of liquids sprayed thereby).

The exemplary sprayer apparatus described herein may be for use with an elongate boom to spray a liquid onto foliage on a ground surface. The sprayer apparatus may include a spray boom, a spray hood coupled to the spray boom, and an extension member extending from a spray hood region to a mount end region. The spray hood region of the extension member may be coupled to the spray boom. The sprayer apparatus may also include a mounting apparatus couplable to the elongate boom and couplable to the mount end region of the extension member to support the spray boom and the spray hood above the ground surface. The mounting apparatus may be configured to allow the extension member to be decoupled from the mounting apparatus while the mounting apparatus is coupled to the elongate boom.

In one or more embodiments, the mounting apparatus may include a first support member and a second support member. The first support member may be couplable to a first portion of the elongate boom and the second support member may be couplable to a second portion of the elongate boom. In at least one embodiment, the mounting apparatus may include an attachment apparatus configured to secure the mount end region of the extension member to the mounting apparatus. In at least one embodiment, the mounting apparatus may define an attachment aperture configured to receive a portion of the mount end region of the extension member to couple the mounting apparatus to the mount end region of the extension member.

In one or more embodiments, the sprayer apparatus may further include a spray nozzle coupled to the spray hood. In one or more embodiments, the sprayer apparatus may further include a spray hose coupled to the spray hood.

In one or more embodiments, the elongate boom and the spray boom may be substantially parallel when the mounting apparatus is coupled to the elongate boom and the mount end region of the extension member. In at least one embodiment, the extension member may be substantially straight. In at least one embodiment, the extension member may define at least one curve. In at least one embodiment, the mounting apparatus may be configured to be coupled to an elongate boom defined by a square cross-section. In at least one embodiment, the mounting apparatus may be configured to be coupled to an elongate boom defined by a round cross-section. In at least one embodiment, the mounting apparatus may be configured to be coupled to an extension member defined by a round cross-section. In one or more embodiments, the sprayer apparatus may further include a coupling apparatus configured to couple an extension member defined by a round cross-section to a spray boom defined by a square cross-section.

In one or more embodiments, the sprayer apparatus may further include a plurality of additional spray hoods coupled to the spray boom. In at least one embodiment, the sprayer apparatus may include a plurality of additional spray hoods coupled to the spray boom and the spray hood and plurality of additional spray hoods may be coupled to each other along an axis defined by the spray boom. The spray hood and plurality of additional spray hoods may define an outer surface and an inner surface and the inner surface may define a channel extending from a first end to a second end of the axis, e.g., within which liquid may be sprayed.

An exemplary system described herein may be for use in retrofitting sprayer apparatus to a plurality of different elongate booms. The system may include a spray boom, a spray hood coupled to the spray boom, and an extension member extending from a spray hood region to a mount end region. The spray hood region of the extension member may be coupled to the spray boom. The system may also include a plurality of different mounting apparatuses and each mounting apparatus of the plurality of different mounting apparatuses may be configured to be coupled to an elongate boom of the plurality of different elongate booms. Further, each mounting apparatus may be configured to be coupled to the mount end region of the extension member to support the spray boom and the spray hood above a ground surface. Still further, each mounting apparatus of the plurality of different mounting apparatuses may be configured to allow the extension member to be decoupled therefrom while being coupled to the elongate boom of the plurality of different elongate booms.

In at least one embodiment, the system may further include a plurality of additional extension members. Each additional extension member of the plurality of different extension members may be configured to be coupled to at least one mounting apparatus of the plurality of different mounting apparatuses. Further, each additional extension member of the plurality of different extension members and the extension member may be different from one another (e.g., different shapes, different sizes, etc.).

In one or more embodiments, at least one extension member of the plurality of different extension members may be straight and/or at least one extension member of the plurality of different extension members may define at least one curve.

In one or more embodiments, at least one mounting apparatus of the plurality of mounting apparatuses includes a first support member and a second support member. The first support member may be couplable to a first portion of at least one elongate boom of the plurality of different elongate booms and the second support member may be couplable to a second portion of the at least one elongate boom of the plurality of different elongate booms.

In one or more embodiments, the system includes a plurality of additional spray hoods coupled to the spray boom. The spray hood and the plurality of additional spray hoods may extend from a first end to a second end along an axis defined by the spray boom and may define an outer surface and an inner surface. The inner surface may define a channel extending from the first end to the second end.

The above summary is not intended to describe each embodiment or every implementation of the present disclosure. A more complete understanding will become apparent and appreciated by referring to the following detailed description and claims taken in conjunction with the accompanying drawings.

DETAILED DESCRIPTION OF EXEMPLARY EMBODIMENTS

Figure 1:
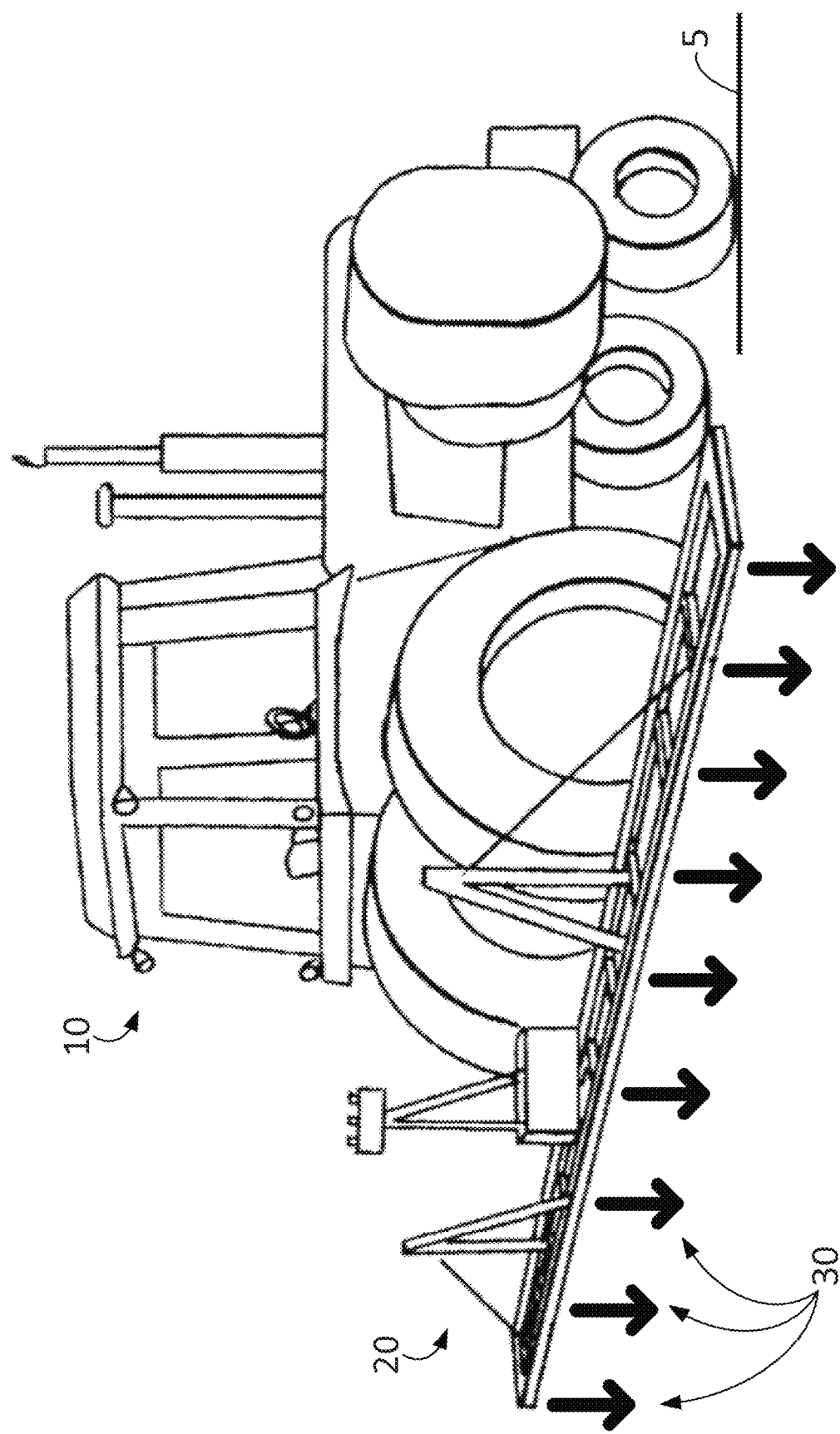
FIG. 1 is a perspective view of a boom mounted to a tractor.

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary apparatus and systems shall be described with reference to FIGS. 2-9. It will be apparent to one skilled in the art that elements from one embodiment may be used in combination with elements of the other embodiments, and that the possible embodiments of such apparatus and systems using combinations of features set forth herein is not limited to the specific embodiments shown in the Figures and/or described herein. Further, it will be recognized that the embodiments described herein may include many elements that are not necessarily shown to scale. Still further, it will be recognized that the size and shape of various elements herein may be modified but still fall within the scope of the present disclosure, although certain one or more shapes and/or sizes, or types of elements, may be advantageous over others.

The present disclosure relates generally to sprayer apparatus and systems for use with an elongate boom to spray a liquid over a ground surface (e.g., onto foliage, onto the ground surface, etc.). Sprayer apparatus may be operable to traverse a ground surface and to spray liquid, such as herbicide, pesticide, etc., using spray nozzles onto foliage (e.g., undesired foliage, crops, etc.) located on or proximate to the ground surface and/or the ground surface itself. To traverse the ground surface, the sprayer apparatus may be mounted on a tractor that moves along, or traverses, the ground surface.

For example, a tractor 10 including sprayers, coupled to an elongate boom, spraying liquid 30 is shown in FIG. 1. As shown, a boom, or frame, 20 may be coupled to the tractor 10 and spray nozzles may be positioned along the boom 20 to spray a liquid 30 towards a ground surface 5. The tractor 10 may move along the ground surface 5 among, or over, foliage (e.g., crops, weeds, etc.). Liquids 30 (e.g., pesticides, herbicides, etc.) may be sprayed onto the foliage and/or ground surface 5 through spray nozzles located on the boom 20 by a pumping system carried by the tractor 10.

Users, such as e.g., farmers, may already own an elongate boom that is coupled to the farmer's tractor and configured for a variety of farming applications including, e.g., spraying fields. These elongate booms may be costly and/or may be difficult to install, remove, and/or reinstall, and thus, changing elongate booms may be costly and/or challenging. Additionally, spray hoods or other features that may be integrated into, or attached to, the elongate boom may be outdated and/or inefficient.

The exemplary sprayer apparatus and systems described herein may be used to retrofit elongate booms (e.g., elongate booms already owned and in use by users) to use various apparatus such as, e.g., spray hoods to control drift. For example, a farmer may already own an elongate boom attached to a tractor, and the elongate boom may not be readily configured, or able, to accept a plurality of spray hoods, and thus, the farmer may use the exemplary sprayer apparatus and systems described herein to retrofit the elongate boom to include a plurality of spray hoods.

Figure 2:
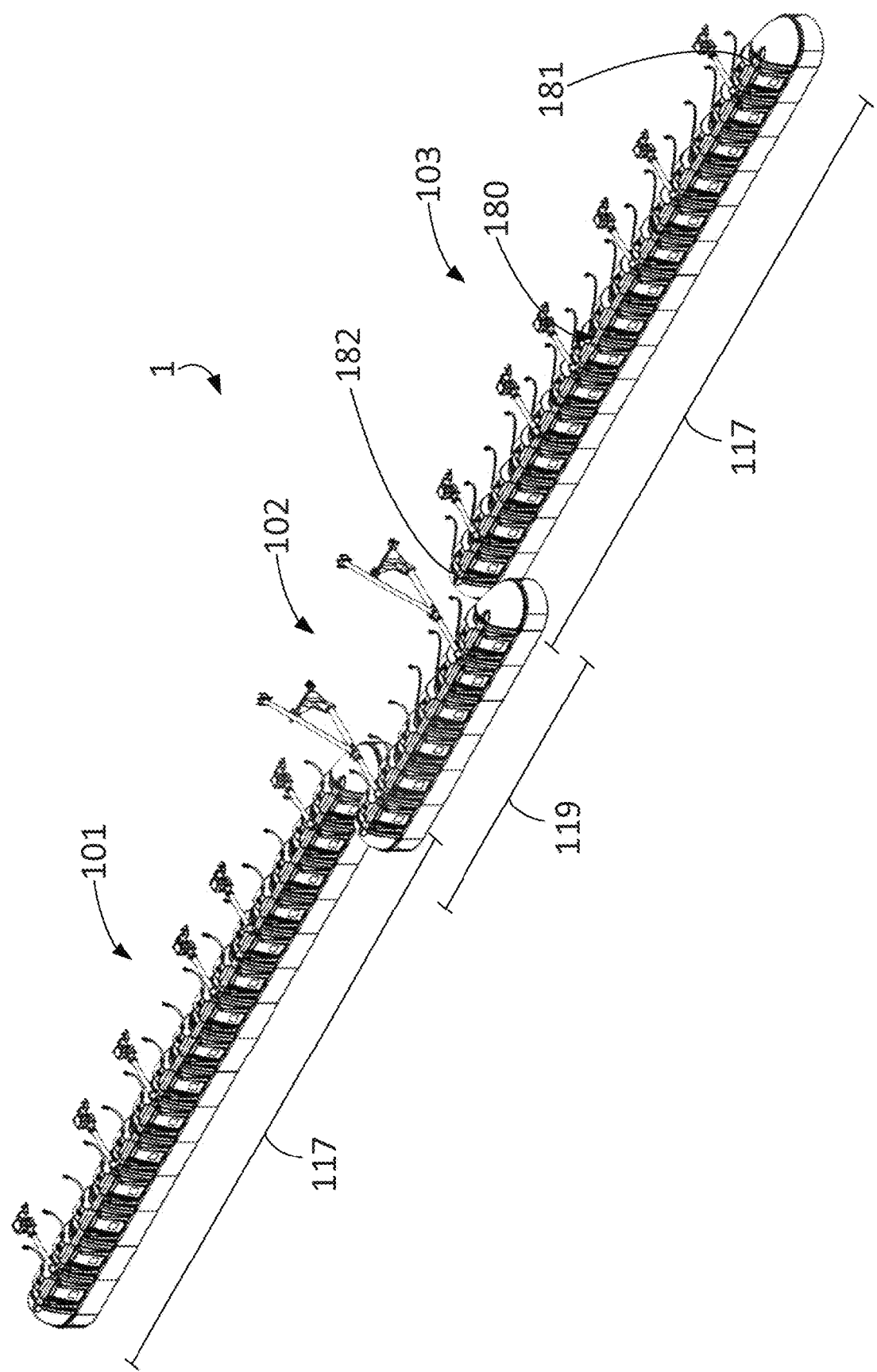
FIG. 2 is a perspective view of an exemplary system for use in retrofitting an exemplary sprayer apparatus to an elongate boom.
Figure 3:
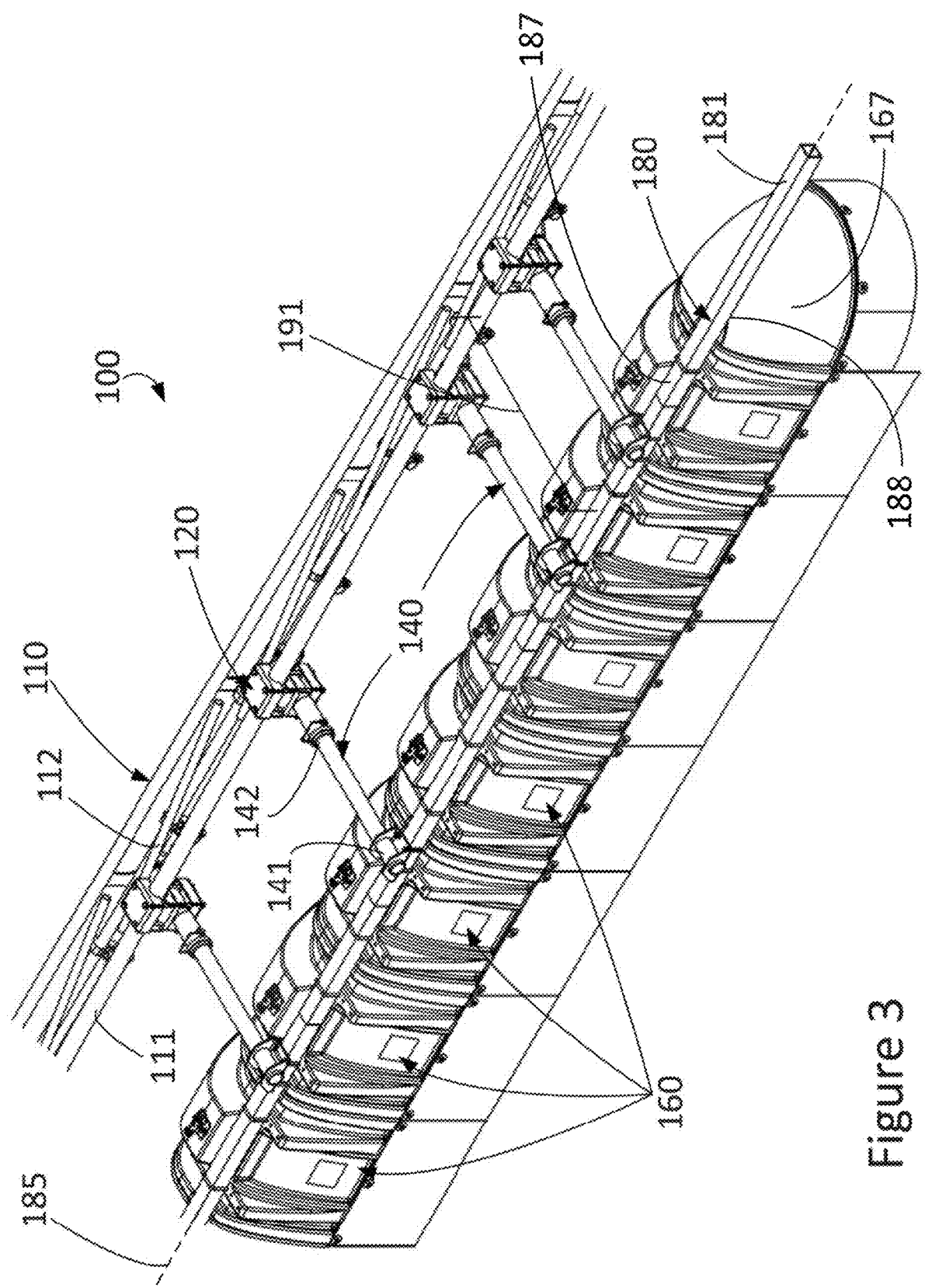
FIG. 3 is a perspective view of a portion of the system of FIG. 2 including the sprayer apparatus coupled to an elongate boom.

A perspective view of an exemplary system 1 for use with an elongate boom to spray a liquid over a ground surface (e.g., onto foliage, onto a ground surface, etc.) is shown in FIG. 2. The exemplary system 1 may described as being usable to retrofit the elongate boom with sprayer apparatus. As shown, the system 1 may include a first section 101, a second section 102, and a third section 103 that may be retrofit to an existing boom. The first and third sections 101, 103 may be attached, or retrofitted, to an elongate boom (not shown, but, e.g., as depicted in FIG. 3) that extends outward from (e.g., the elongate boom may extend outward from a tractor in a direction generally perpendicular to the forward direction of the tractor) a tractor such as, e.g., the tractor 10 shown in FIG. 1. The second section 102 may be located between the first and third sections 101, 103 and may be connected to a frame, or other apparatus, of a tractor such as, e.g., the tractor 10 shown in FIG. 1.

As shown, the first, second, and third sections 101, 102, 103 may be described as extending substantially parallel to one another and substantially perpendicular to the direction in which the tractor traverses a ground surface (e.g., a forward or reverse direction when not turning). In some embodiments, each of the first and third sections 101, 103 may define a length 117 (e.g., length perpendicular to the direction in which the tractor traverses a ground surface) that is, e.g., greater than or equal to 10 feet, greater than or equal to 20 feet, greater than or equal to 35 feet, greater than or equal to 45 feet, greater than or equal to 60 feet, greater than or equal to 70 feet, etc., and/or less than or equal to 100 feet, less than or equal to 85 feet, less than or equal to 75 feet, less than or equal to 65 feet, less than or equal to 50 feet, etc. In some embodiments, the second section 102 may define a length 119 (e.g., length perpendicular to the direction in which the tractor traverses a ground surface) that is, e.g., greater than or equal to 5 feet, greater than or equal to 10 feet, greater than or equal to 15 feet, greater than or equal to 20 feet, greater than or equal to 25 feet, etc., and/or less than or equal to 40 feet, less than or equal to 35 feet, less than or equal to 30 feet, less than or equal to 22.5 feet, less than or equal to 17.5 feet, etc.

The system 1 of FIG. 2, and each of the first, second, and third sections, 101, 102, 103 thereof, may include spray apparatus, for example, a perspective view of a portion (e.g., a portion of the third section 103) of the system 1 of FIG. 2 including sprayer apparatus 100 coupled to an elongate boom 110 is shown in FIG. 3. The elongate boom 110 may be attached to a tractor, such as shown in FIG. 1, and may extend perpendicular to the direction the tractor moves along the ground surface. The sprayer apparatus 100 may be coupled to the elongate boom 110, e.g., to retrofit the sprayer apparatus 100 to the elongate boom 110.

Figure 8A:
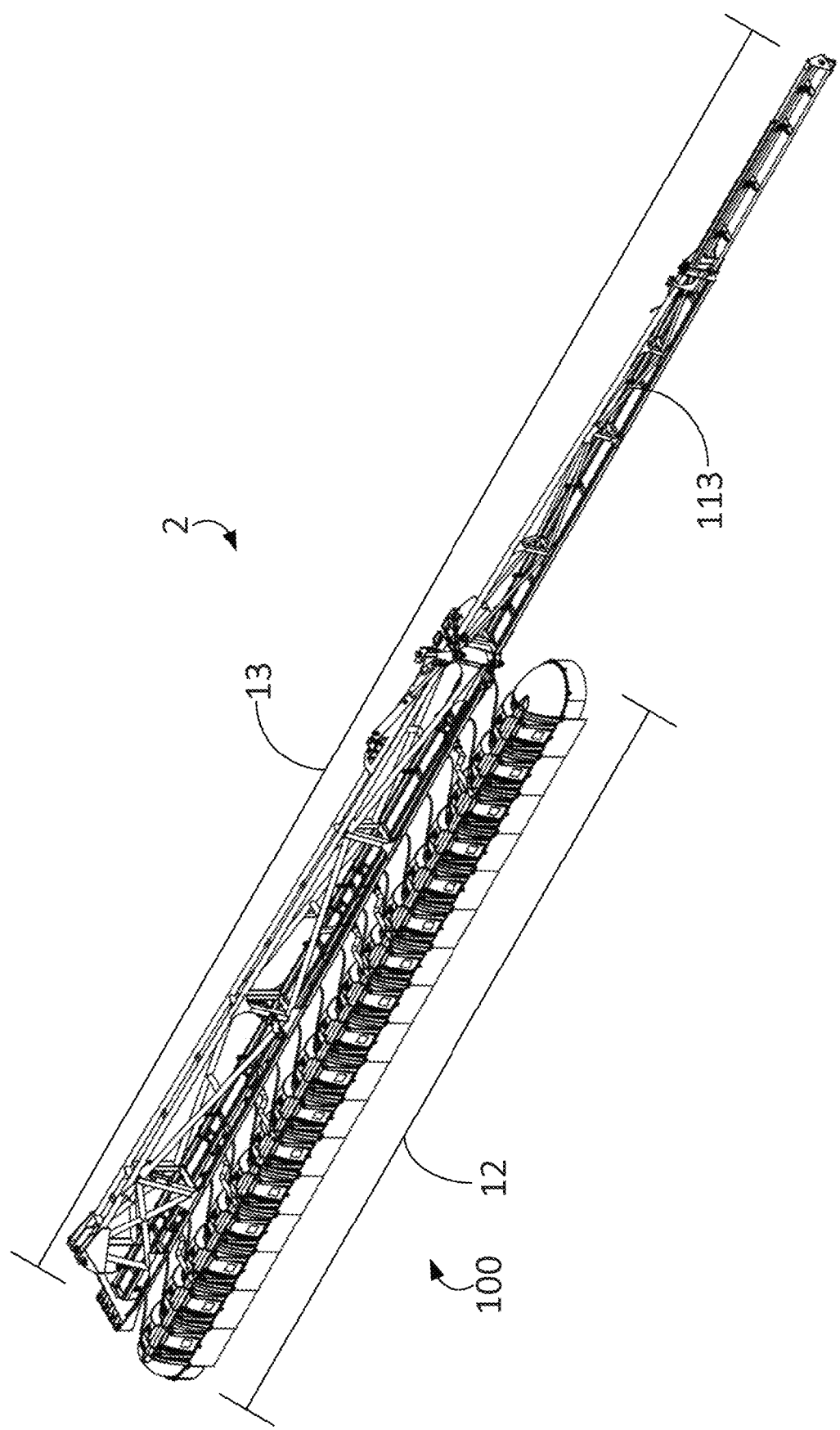
FIG. 8A is a perspective view of another exemplary system for use in retrofitting sprayer apparatus to another elongate boom.

In some embodiments, the elongate boom 110 may extend beyond a length of the sprayer apparatus 100. In other words, the sprayer apparatus 100 may extend a distance less than a distance the elongate boom 110 extends. For example, as shown in FIG. 8A, which also depicts an exemplary system including sprayer apparatus, a length 13 of the elongate boom 110 may be, e.g., greater than or equal to 75%, greater than or equal to 125%, greater than or equal to 160%, greater than or equal to 175%, etc. and/or less than or equal to 250%, less than or equal to 200%, less than or equal to 170%, less than or equal to 150% of a length 12, etc. of the sprayer apparatus 100. Conversely, the length 12 of the sprayer apparatus 100 may be, e.g., greater than or equal to 30%, greater than or equal to 45%, greater than or equal to 60%, greater than or equal to 70%, etc. and/or less than or equal to 110%, less than or equal to 90%, less than or equal to 75%, less than or equal to 65%, etc. of the length 13 of the elongate boom 110. In some embodiments, at least a portion of the elongate boom 110 may be configured to be folded (e.g., folded towards the tractor) to decrease the length of the elongate boom 110 when not in use (e.g., when not spraying crops, etc.). In such embodiments, the elongate boom 110 may decrease in length, but may increase in height (e.g., the height profile of the folded elongate boom may be longer than when the elongate boom is unfolded).

The elongate boom 110 may include one portion or a plurality of portions as will be described further herein with respect to FIG. 3. Each portion of the elongate boom 110 may define a cross-sectional shape taken across the long axis of the boom such as, e.g., a square cross-section, a round cross-section, etc.

The sprayer apparatus 100 may include multiple portions and apparatus to, e.g., provide the functionality described herein. As shown, the sprayer apparatus 100 may include one or more spray booms 180, one or more spray hoods 160, one or more extension members 140 and one or more mounting apparatuses 120. Although one or more portions of the exemplary sprayer apparatus 100, such as the spray booms 180, spray hoods 160, extension members 140, mounting apparatuses 120, etc., may be described herein in the singular tense and/or the plural tense, it is to be understood that the description herein is not intended to limit an amount of portions that the exemplary sprayer apparatus 100 may include. In other words, the exemplary sprayer apparatus 100 may include one or a plurality of each of the one or more portions. For example, an exemplary sprayer apparatus 100 may include one spray boom 180, a plurality of spray hoods 160, a plurality of extension members 140, and a plurality of mounting apparatuses 120.

The one or more spray hoods 160 may be configured to direct liquid onto foliage and/or a ground surface. The spray hoods 160 may be further described as being able to control and/or minimize drift of liquid being sprayed onto the foliage and/or the ground surface. The spray boom 180 may be configured to be coupled to the spray hoods 160 to support the spray hoods 160 above a ground surface. As shown, the sprayer apparatus 100 includes a plurality of spray hoods 160 arranged along and coupled to the spray boom 180. The spray hoods 160 aligned along the spray boom 180 may provide an ability to spray a large area of foliage with every pass across a field over the ground surface. As shown in FIG. 3, the sprayer apparatus 100 may include a spray hood end cap 167 positioned proximate an end of the spray hoods 160 aligned along the spray boom 180. The spray hood end cap 167 may be configured to contain the sprayed liquid from drifting to undesired locations from the end of the spray hoods 160.

As described, the sprayer apparatus 100 may also include one or more extension members 140 that are configured to be coupled to the spray boom 180 and to the mounting apparatus 120. The extension members 140 may be described as positioning, or locating, the spray boom 180 away from the elongate boom 110 to position, or locate, a plurality of spray hoods 160 away from the elongate boom 110. In some examples, spray hoods 160 may not be positionable proximate the elongate boom 110, and thus, the extensions members 140 may space, or position, the spray hoods 160 to be not proximate the elongate boom 110 such that, e.g., the elongate boom 110 and spray hoods 160 do not interfere with each other. The extension members 140 may extend from a spray hood region 141 to a mount end region 142, and the extension member 140 may be coupled to the spray boom 180 proximate the spray hood region 141 of the extension member 140.

The extension members 140, the spray hoods 160, and spray boom 180 may be coupled together in multiple different configurations. As shown in FIG. 3, the extension member 140 and the spray hood 160 are coupled to the spray boom 180 on opposite sides of the spray boom 180. More specifically, as shown, the extension member 140 is coupled to a top side 187 of the spray boom 180 and the spray hoods 160 is coupled to a bottom side 188 of the spray boom 180.

The extension member 140 may include (e.g., be formed of, etc.) one or more materials such as, e.g., aluminum, steel, polymer, etc. A cross-section of the extension member 140 taken perpendicular to a long axis 149 as labeled in FIG. 4A defined by the extension member 140 may be defined by a variety of shapes, e.g., round, square, rectangular, diamond, etc. In some embodiments, the extension member 140 may define a length from the spray hood region 141 to the mount end region 142 that is, e.g., greater than or equal to 1 foot, greater than or equal to 2 feet, greater than or equal to 4 feet, greater than or equal to 6 feet, greater than or equal to 7 feet, etc., and/or less than or equal to 12 feet, less than or equal to 10 feet, less than or equal to 8 feet, less than or equal to 5 feet, less than or equal to 3 feet, etc. In some embodiments, the extension member 140 may define a width (e.g., perpendicular to the length) that is, e.g., greater than or equal to 0.5 inches, greater than or equal to 1 inch, greater than or equal to 2 inches, greater than or equal to 3 inches, greater than or equal to 4.5 inches, etc., and/or less than or equal to 12 inches, less than or equal to 8 inches, less than or equal to 6 inches, less than or equal to 5 inches, less than or equal to 4 inches, etc.

As described herein, the sprayer apparatus 100 may also include mounting apparatus 120 that is configured to be coupled to the extension member 140 and the elongate boom 110, e.g., to retrofit the sprayer apparatus 100 to the elongate boom 110. The extension member 140 may be coupled to the mounting apparatus 120 proximate the mount end region 142. The mounting apparatus 120 may support the spray boom 180 and the spray hood 160 above the ground surface when the mounting apparatus 120 is coupled to the elongate boom 110. More specifically, the mounting apparatus 120 may be coupled to the elongate boom 110 and to the extension member 140, the extension members 140 may be coupled to the spray boom 180, and the spray boom 180 may be coupled to the spray hoods 160, which, in turn, supports the spray hoods 160 above the ground surface. The mounting apparatus 120 may include (e.g., be formed of, etc.) one or more materials such as, e.g., aluminum, steel, polymer, etc. and one or more portions which will be described herein with respect to FIGS. 5A-5B.

As described herein, the elongate boom 110 may include more than one portion, and the mounting apparatus 120 may be coupled to more than one portion of the elongate boom 110, e.g., to retrofit the sprayer apparatus 100 to the elongate boom 110. As shown in FIG. 3, the elongate boom 110 may include a first portion 111 and a second portion 112 and the mounting apparatus 120 may be configured to be coupled to both of the first portion 111 of the elongate boom 110 and the second portion 112 of the elongate boom 110. Coupling the mounting apparatus 120 to more than one portion (e.g., proximate two locations) of the elongate boom 110 may provide stability to the sprayer apparatus 100 (e.g., rotational stability). In some embodiments, the mounting apparatus 120 may be configured to be coupled to an elongate boom 110, or a portion thereof, that may be defined by a round cross-section. In such or other embodiments, where the elongate boom 110 is defined by a round cross-section, the mounting apparatus 120 may be secured (e.g., pinned, fastened, etc.) to the elongate boom 110 to prevent the mounting apparatus 120 from rotating around the elongate boom 110 (which in turn, the rotation may cause the mounting apparatus 120 to no longer support the spray boom 180 and spray hood 160 above the ground surface). In some embodiments, such as the embodiment shown in FIGS. 3-6, the mounting apparatus 120 may be coupled to a first portion 111 of the elongate boom 110 and a second portion 112 of the elongate boom to prevent the mounting apparatus 120 from rotating around the elongate boom 110. In some embodiments, the mounting apparatus 120 may be configured to be coupled to an elongate boom 110 that may be defined by, e.g., a square cross-section, a rectangular cross-section, a diamond cross-section, etc.

As shown in FIG. 3, the elongate boom 110 and the spray boom 180 may be configured, or designed, to be substantially parallel to one another when the mounting apparatus 120 is coupled to the elongate boom 110. In such embodiments, the extension member 140 may be described as being generally perpendicular to the elongate boom 110 and the spray boom 180.

It may be described that the spray boom 180 may be spaced away, or apart, from the elongate boom 110 when the mounting apparatus 120 is coupled to the elongate boom 110 and to the extension member 140, and the extension member 140 is coupled to the spray boom 180. In other words, the spray hood 160 and spray boom 180 may not be in contact with or adjacent to the elongate boom 110 when the mounting apparatus 120 is coupled to the elongate boom 110 and to the extension member 140, and the extension member 140 is coupled to the spray boom 180. In some embodiments, a distance 191 defined between the elongate boom 110 and the spray boom 180 as shown in FIG. 3 may be, e.g., greater than or equal to 0.5 feet, greater than or equal to 1 foot, greater than or equal to 3 feet, greater than or equal to 6 feet, etc., and/or less than or equal to 10 feet, less than or equal to 8 feet, less than or equal to 5 feet, less than or equal to 4 feet, etc. As shown in FIG. 3, the spray boom 180 may be described as being horizontally spaced away, or apart, from the elongate boom 180 (e.g., the extension member 140 may be designed as being substantially parallel with the ground surface, the spray boom 180 is not positioned or located between the elongate boom 110 and the ground surface, etc.).

In some embodiments, the height of the spray boom 180 from the ground surface may be described as being substantially similar to the height of the elongate boom 110 from the ground surface proximate the location that the mounting apparatus 120 is coupled to the elongate boom 110. In other embodiments, the height of the spray boom 180 from the ground surface may be described as being, e.g., greater than or equal to 0.25 feet, greater than or equal to 0.5 feet, greater than or equal to 0.75 feet, greater than or equal to 1.5 feet, etc., and/or less than or equal to 4 feet, less than or equal to 3 feet, less than or equal to 2 feet, less than or equal to 1 feet, etc. above the height of the elongate boom 110 from the ground surface proximate the location that the mounting apparatus 120 is coupled to the elongate boom 110. In yet other embodiments, the height of the spray boom 180 from the ground surface may be described as being, e.g., greater than or equal to 0.25 feet, greater than or equal to 0.5 feet, greater than or equal to 0.75 feet, greater than or equal to 1.5 feet, etc., and/or less than or equal to 4 feet, less than or equal to 3 feet, less than or equal to 2 feet, less than or equal to 1 feet, etc. below the height of the elongate boom 110 from the ground surface proximate the location that the mounting apparatus 120 is coupled to the elongate boom 110.

Figure 4A:
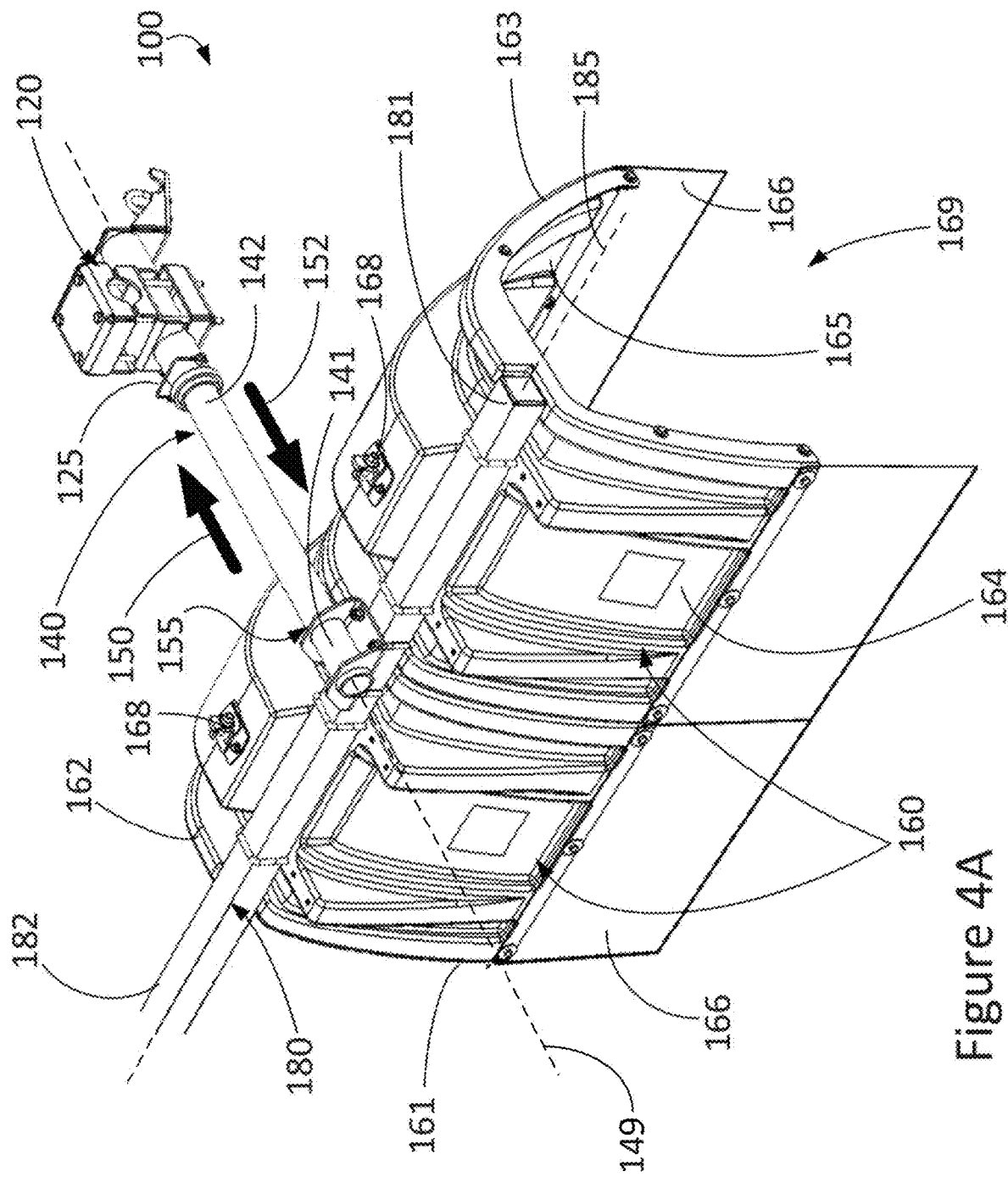
FIG. 4A is a perspective view of a portion of the sprayer apparatus of FIG. 2.
Figure 4B:
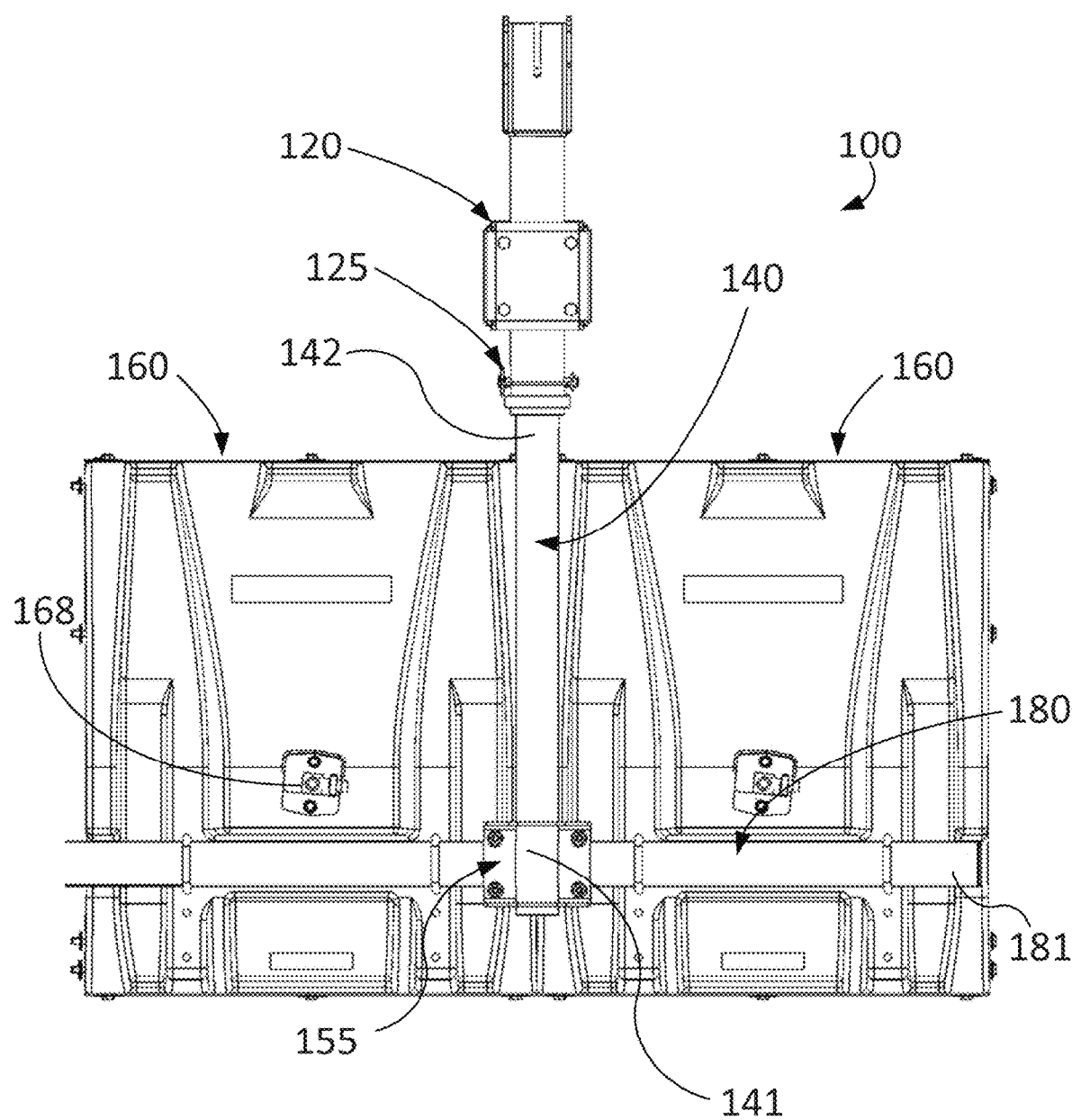
FIG. 4B is a top view of the sprayer apparatus portion of FIG. 4A.
Figure 4C:
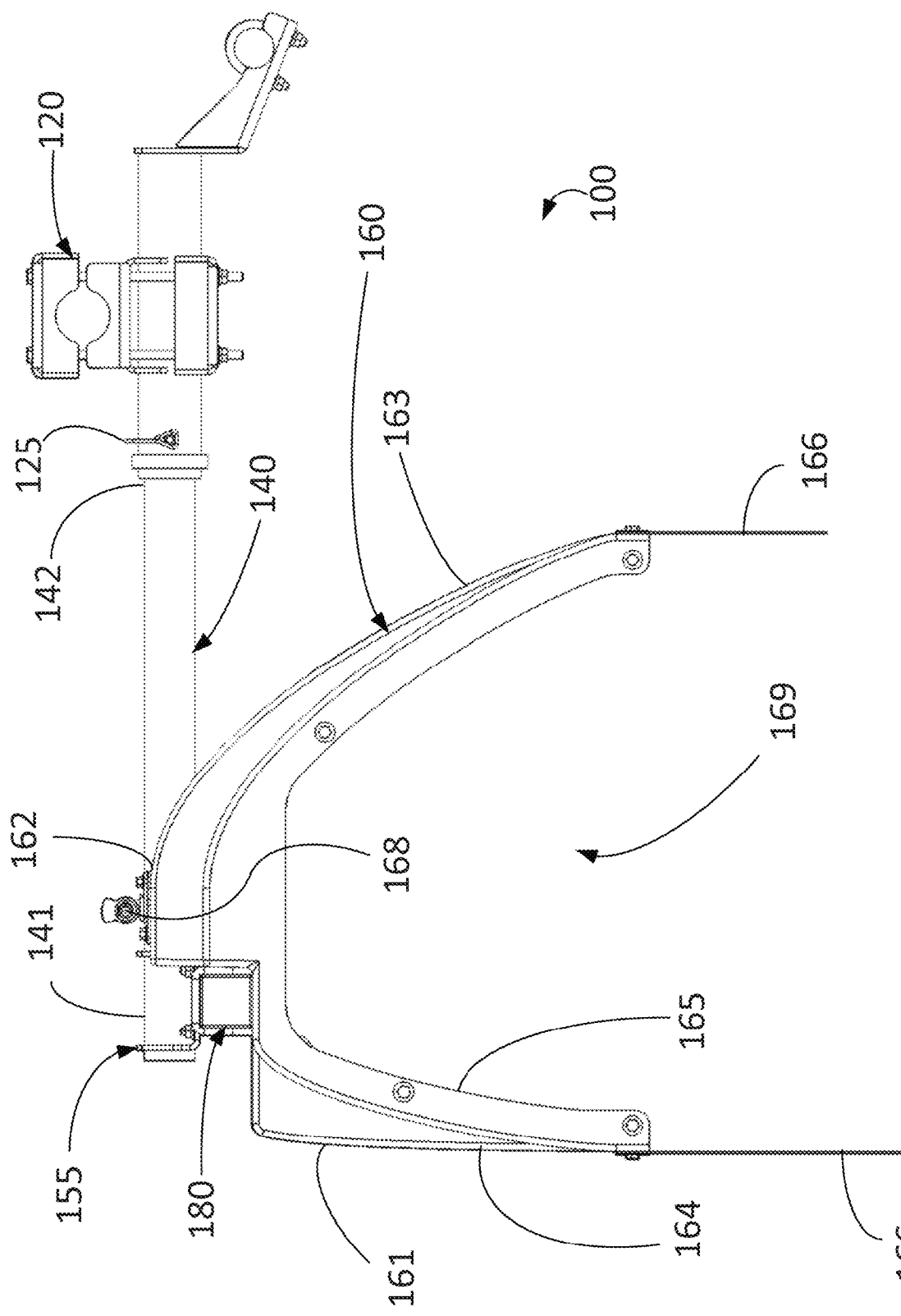
FIG. 4C is a side view of the sprayer apparatus portion of FIG. 4A.

A portion of the sprayer apparatus 100 of FIG. 2 is shown in FIGS. 4A-4C. As shown, each spray hood 160 of the sprayer apparatus 100 may define a substantially upside-down, U-shaped cross-section. For example, each spray hood may be described as including a first portion 161, a second portion 162, and a third portion 163. The second portion 162 may be proximate the apex of the upside-down U-shape and the first and third portions 161, 163, respectively, may be proximate each side of the upside-down U-shape. As shown, the third portion 163 of the spray hood 160 may be closer to the mounting apparatus 120 than the first portion 161 of the spray hood 160. Also as shown, the second portion 162 of the spray hood 160 may be attached to the spray boom 180. In other embodiments, the spray hood 160 may be attached to the spray boom 180 proximate the first or third portion 161, 163 of the spray hood 160. The spray hood 160 may include (e.g., be formed of, etc.) one or more materials such as, e.g., aluminum, steel, polymer, etc. In at least one embodiment, the spray hood 160 may include (e.g., be formed of, etc.) uniformly thick, resiliently flexible polymeric material (e.g., made of about 0.21 inch thick polypropylene, etc.).

Each spray hood 160 may be made, or formed, by spin or rotary molding to form two of the spray hoods 160 together as a generally cylindrical part, and by then cutting the spray hoods 160 from each other, but could also be made by injection molding. For example, similar spray hoods may be described in U.S. Pat. No. 5,520,335 filed on Jun. 6, 1994 and entitled "Spray Hood and Assembly Including the Spray Hood," which is incorporated herein by reference in its entirety.

The spray hood 160 and the spray boom 180 may be coupled to each other in multiple different ways. For example, the spray hood 160 and the spray boom 180 may be coupled to each other using, e.g., an adhesive, welding, one or more fasteners, etc. As shown, the spray hood 160 and the spray boom 180 are coupled to each other using a pair of U-shaped fasteners, each defined by two ends. The U-shaped fasteners may wrap around a portion of the spray boom 180 and the ends of the U-shaped fasteners may extend through a portion of the spray hood 160 where the ends may be secured using, e.g., nuts.

The spray hood 160 may further include a spray guard 166 coupled to the first and/or third portions 161, 163 of the spray hood 160. The spray guard 166 may extend towards the ground surface (e.g., away from the spray boom 180) to help contain the liquid (e.g., reduce drift of the liquid) that is sprayed onto foliage and/or a ground surface. As shown, the spray guards 166 are coupled to the first portion 161 of the spray hood 160 and the third portion 163 of the spray hood 160.

As shown in FIGS. 2-4, a plurality of spray hoods 160 may be coupled to the spray boom 180. The spray boom 180 may be described as extending from a first end region 181 to a second end region 182 along a spray boom axis 185. The spray boom 180 may include (e.g., be formed of, etc.) one or more materials such as, e.g., aluminum, steel, polymer, etc.

Since the spray hoods 160 are coupled to the spray boom 180, it may be described that the spray hoods 160 may also extend from the first end region 181 of the spray boom 180 to the second end region 182 of the spray boom 180 along the spray boom axis 185 defined by the spray boom 180 (see, e.g., FIG. 3). As shown, each of the plurality of spray hoods 160 may define an outer surface 164 and an inner surface 165. The inner surface 165 may define a channel 169 within which the liquid may be dispersed, or sprayed, and the outer surface 164 may be opposite the inner surface 165 facing outwardly from the spray hood 160. In other words, the inner surface 165 may be described as being proximate the location where the liquid is dispersed, and the outer surface 164 may be described as being located on an outside of the spray hood 160. Further, it may be described that the plurality of spray hoods 160 are coupled to the spray boom 180 such that the upside-down U-shape cross-sections of the spray hoods 160 and the channels 169 defined thereby align for form one continuous channel 169 for containing sprayed liquid that may extend along the spray boom axis 185.

The sprayer apparatus 100 may further include one or more spray nozzles 168. The spray nozzles 168 may be coupled to the spray hoods 160 and may be configured to spray liquid within the channel 169 to contact foliage on the ground surface or the ground surface itself. In some embodiments, one spray nozzle 168 is coupled to each spray hood 160. The sprayer apparatus 100 may further include one or more spray hoses (see, e.g., FIG. 2). Each spray hose may extend from a first end to a second end. The first end of the spray hose may be coupled to the spray nozzle 168 when the spray hose is coupled to the spray hood 160 and the second end of the spray hose may be coupled to a liquid distribution apparatus (not shown) that may provide a source of liquid to be distributed through the spray hoses to the spray nozzles 168.

The mounting apparatus 120 may be couplable to the extension member 140 in multiple different ways. As shown, the mounting apparatus 120 may be couplable to the mount end region 142 of the extension member 140 by receiving a portion of the mount end region 142 of the extension member 140. For example, the mounting apparatus 120 may receive the mount end region 142 of the extension member 140 by, e.g., inserting a portion of the extension member 140 into a portion of the mounting apparatus 120, inserting a portion of the mounting apparatus 120 into a portion of the extension member 140, coupling an additional component to both the extension member 140 and the mounting apparatus 120, etc. As shown, the mounting apparatus 120 is couplable to the extension member 140 by inserting a portion of the mount end region 142 of the extension member 140 into a portion of the mounting apparatus 120. Further, the extension member 140 may be described as being removably couplable to the mounting apparatus 120 such that the extension member 140 may be readily coupled to and/or decoupled from the mounting apparatus 120.

The extension member 140 may be configured to be coupled to the mounting apparatus 120 in multiple different ways. For example, the mounting apparatus 120 may be coupled, and/or retrofitted, to the elongate boom 110 before the mounting apparatus 120 is coupled to the extension member 140. The extension member 140 may then be coupled to the mounting apparatus 120 by moving the extension member 140 in a first direction 150 towards the mounting apparatus 120. As described herein, a plurality of extension members 140 may be coupled to the spray boom 180 (see, e.g., FIG. 3). The plurality of extension members 140 may be coupled to a corresponding plurality of mounting apparatus 120 substantially simultaneously. In some embodiments, the sprayer apparatus 100 may include, e.g., one, two, three, four, five, six, seven, eight, nine, ten, etc. spray hoods 160 for every, e.g., one, two, three, four, five, etc. extension members 140. For example, the sprayer apparatus 100 may include five spray hoods 160 for every two extension members 140, as shown, e.g., in the first and third sections 101, 103 of FIG. 2.

Further, the mount end region 142 of the extension member 140 may be configured to be decoupled from the mounting apparatus 120. The extension member 140 may be decoupled from the mounting apparatus 120 by moving the extension member 140 in a second direction 152 away from the mounting apparatus 120. As described herein, a plurality of extension members 140 may be coupled to the spray boom 180, and the plurality of extension members 140 may be decoupled from a plurality of mounting apparatus 120 substantially simultaneously.

The mounting apparatus 120 may include an attachment apparatus 125 configured to secure, or restrain, the mount end region 142 of the extension member 140 to the mounting apparatus 120. For example, in some embodiments, the mounting apparatus 120 may define a hole through a section, or portion, such that, e.g., a pin may be inserted into the hole and through a section, or portion, of the extension member 140 in order to secure the extension member 140 to the mounting apparatus 120. In other embodiments, the attachments apparatus 125 may be, e.g., a bolt, a fastener, a clip, a groove, a snap, etc.

Figure 5A:
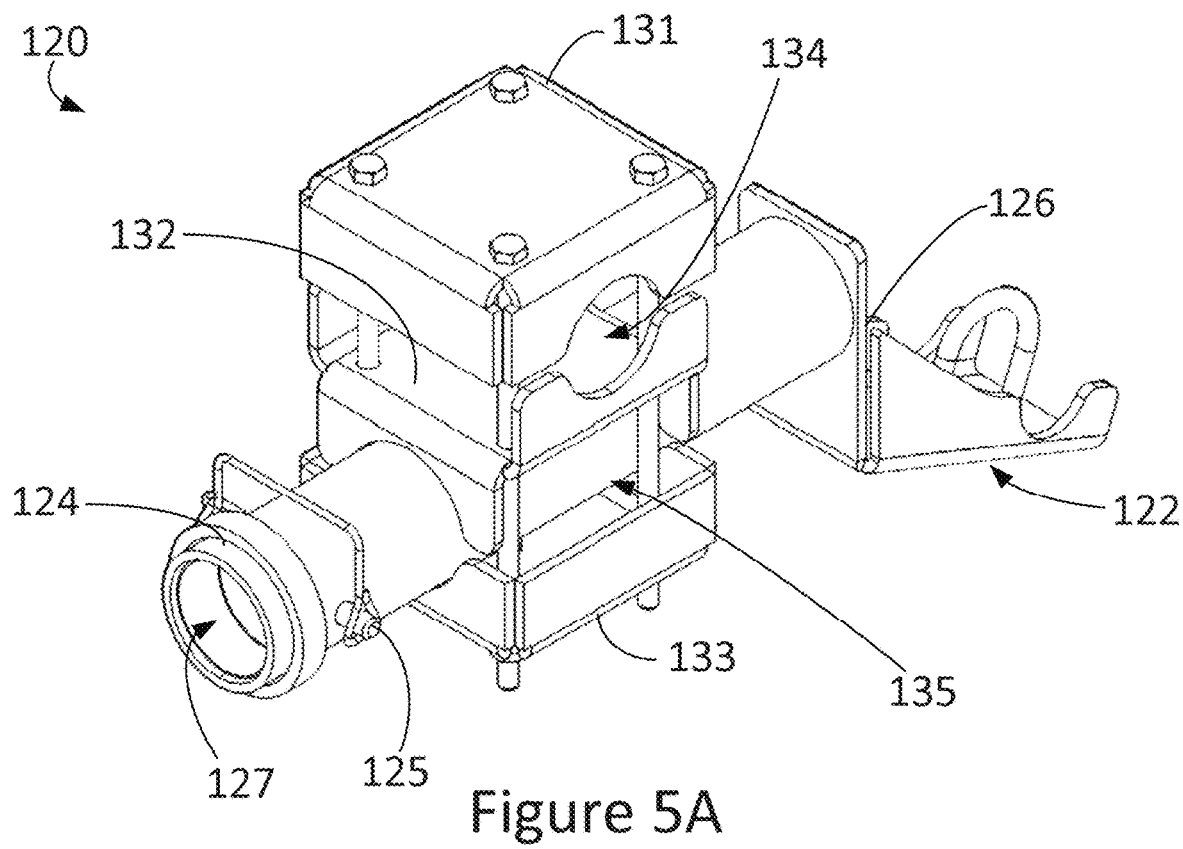
FIG. 5A is a perspective view of an exemplary mounting apparatus of the sprayer apparatus of FIG. 2.
Figure 5B:
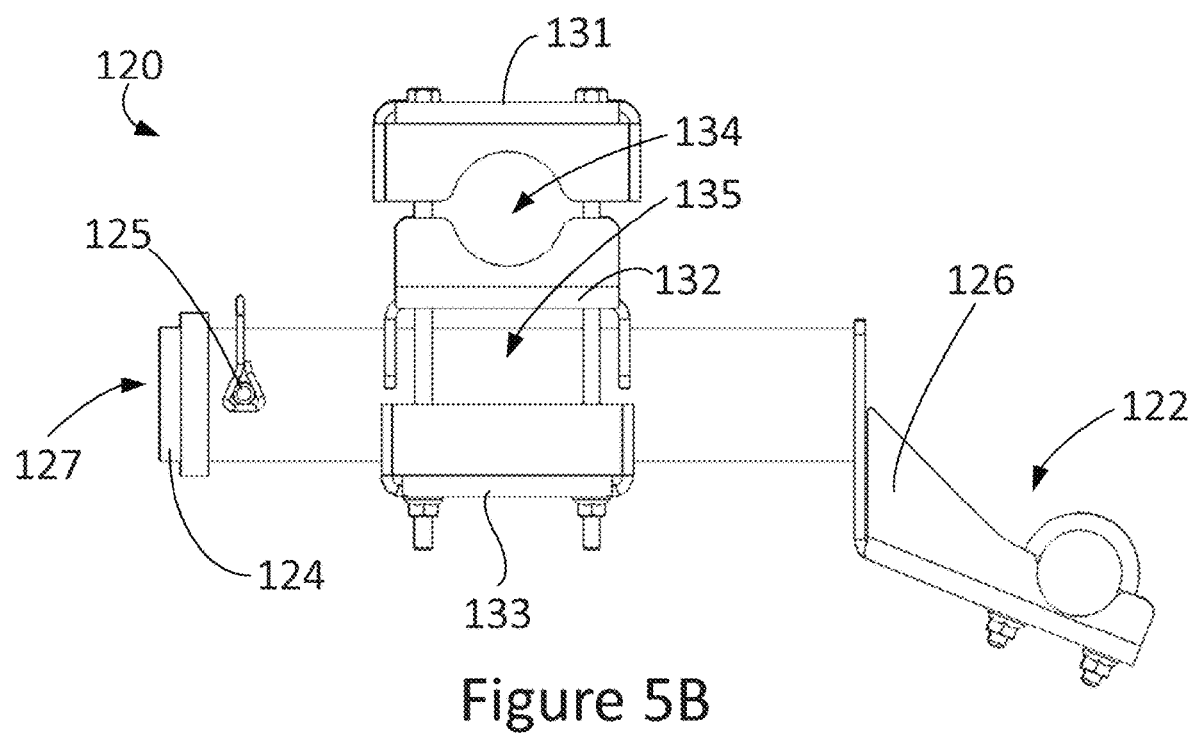
FIG. 5B is a side view of the mounting apparatus of FIG. 5A.

As described herein, the mounting apparatus 120 may be configured to be coupled to the elongate boom and the mount end region 142 of the extension member 140. In some embodiments, the mounting apparatus 120 may include multiple portions, or sub-components. For example, as shown in FIGS. 5A-5B, the mounting apparatus 120 includes a first bracket 131, a second bracket 132, and a third bracket 133 that together define a first aperture 134 and a second aperture 135 configured for attachment to the elongate boom and the extension member 140, respectively.

The first, second, and third brackets 131, 132, 133 may be coupled to each other in multiple different ways. For example, the first, second, and third brackets 131, 132, 133 may be coupled to each other using, e.g., adhesive, welding, bolts, one or more fasteners, etc. As shown, the first, second, and third brackets 131, 132, 133 are coupled to each other using four fasteners that extend through each one of the first, second, and third brackets 131, 132, 133 and are secured using nuts.

The first and second brackets 131, 132 may define the first aperture 134 and the second and third brackets 132, 133 may define the second aperture 135. As shown in FIG. 5A, the first and second apertures 134, 135 may be perpendicular to one another. The first aperture 134 may be configured to receive one or more portions of the elongate boom 110 to, e.g., couple, and/or retrofit, the mounting apparatus 120 to the elongate boom 110. For example, a portion of the elongate boom 110 may be described as being "pinched" between the first bracket 131 and the second bracket 132. As shown, the first aperture 134 may be configured to receive an elongate boom portion defining a round cross-section. In other embodiments, the first aperture 134 may be configured to receive a variety of different cross-sectional shaped elongate boom portions (e.g., round, square, diamond, rectangular, etc.).

As described herein, the mounting apparatus 120 may be configured to receive the mount end region 142 of the extension member 140 to couple the mounting apparatus 120 to the extension member 140. The mounting apparatus 120 may be described as extending from an extension member region 124 to an elongate boom region 126. The extension member region 124 may define an attachment aperture 127 that may be configured to receive at least a portion of the mount end region 142 of the extension member 140. The attachment aperture 127 may define a cross-sectional shape (e.g., round, square, diamond, rectangular, etc.) that corresponds with a cross-sectional shape of the mount end region 142 of the extension member 140.

The mounting apparatus 120 may further include a support member 122 proximate the elongate boom region 126. The support member 122 may be configured to be coupled to a second portion of an elongate boom (see, e.g., FIG. 3).

The support member 122 may be configured to be coupled to a variety of different shaped portions of an elongate boom (e.g., round, square, diamond, rectangular, etc.), and may be utilized to help stabilize the mounting apparatus 120 connection to an elongate boom. In some embodiments, the mounting apparatus 120 may include more than two support members that are configured to be coupled to an elongate boom (e.g., an elongate boom that includes multiple portions).

The mounting apparatus 120 may include an attachment apparatus 125 configured to couple the mounting apparatus 120 to the mount end region 142 of the extension member 140. The extension member 140 may include one or more features configured to work with the attachment apparatus 125 of the mounting apparatus 120 to couple the mounting apparatus 120 to the mount end region 142 of the extension member 140. As shown, the attachment apparatus 125 includes a pin configured to extend through a hole in the mounting apparatus 120 and a hole 145 in the extension member 140.

Figure 6A:
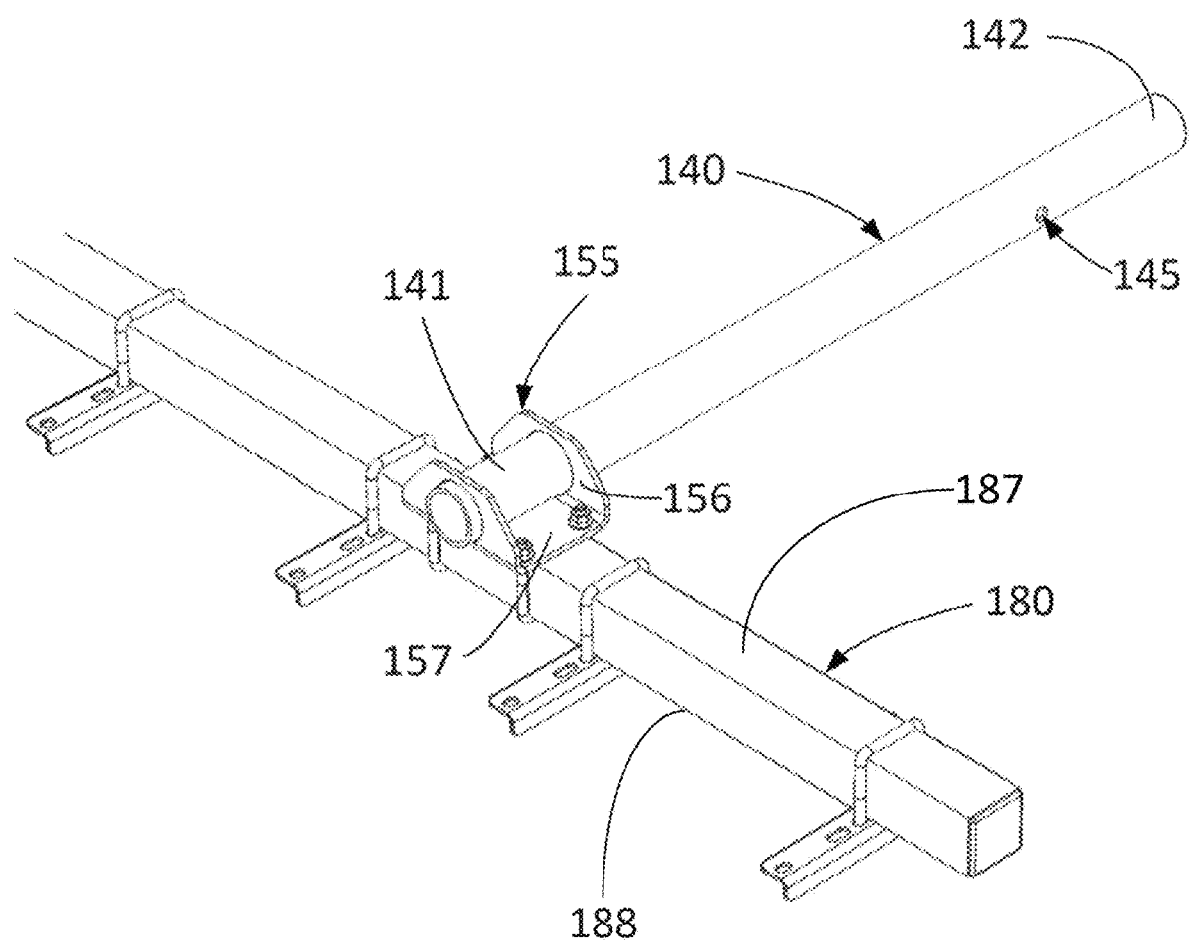
FIG. 6A is a perspective view of an exemplary spray boom and an exemplary extension member of the sprayer apparatus of FIG. 2.
Figure 6B:
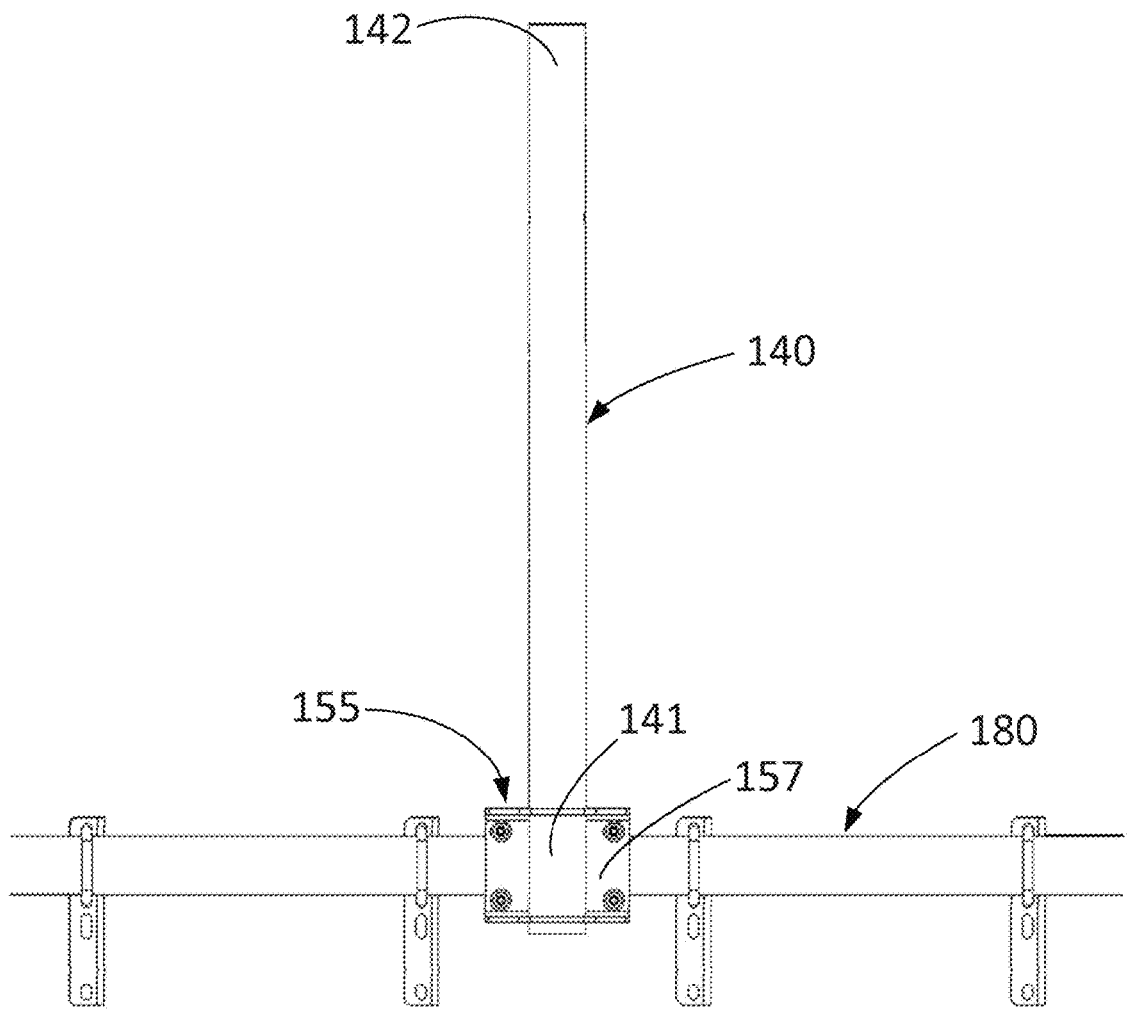
FIG. 6B is a top view of the spray boom and the extension member of FIG. 6A.
Figure 6C:
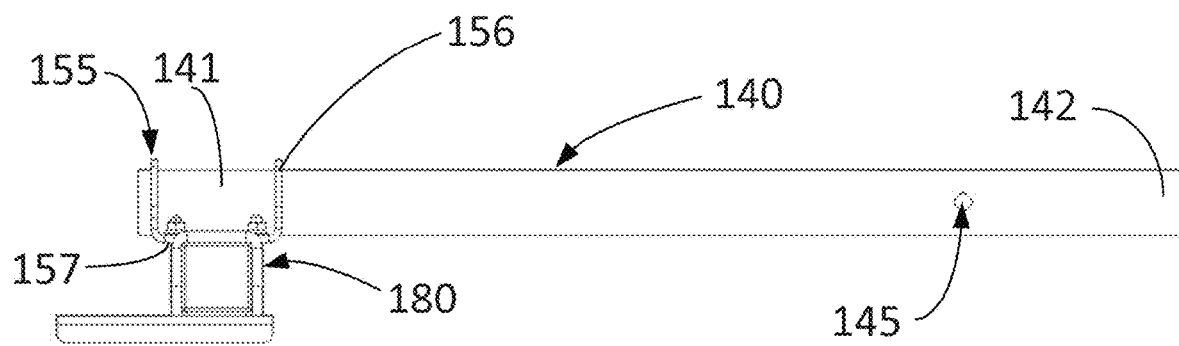
FIG. 6C is a side view of the spray boom and the extension member of FIG. 6A.

As described herein, the extension member 140 may be coupled to the spray boom 180 as shown in FIGS. 6A-6C. To provide the coupling between the extension member 140 and the spray boom 180, the sprayer apparatus 100 may further include a coupling apparatus 155 as shown in FIGS. 6A-6C. The coupling apparatus 155 may include a top portion 156 and a bottom portion 157. The top portion 156 may be coupled to the spray hood region 141 of the extension member 140 and the bottom portion 157 may be coupled to the spray boom 180. As shown, the extension member 140 and the spray boom 180 may be coupled to each other such that the extension member 140 and the spray boom 180 are substantially perpendicular to one another. In other embodiments, the extension member 140 and the spray boom 180 may be coupled to each other such that the extension member 140 and the spray boom 180 are not substantially perpendicular to one another. Further, as shown, the coupling apparatus 155 may be configured to couple an extension member 140 defined by a round cross-section to a spray boom 180 defined by a square cross-section. In some embodiments, the extension member 140 and/or the spray boom 180 may be attached or coupled to the coupling apparatus 155 by, e.g., an adhesive, welding, one or more fasteners, etc. As shown, the extension member 140 is coupled to the coupling apparatus 155 through an aperture in the coupling apparatus 155 and the spray boom 180 is coupled to the coupling apparatus 155 using one or more U-shaped fasteners that may wrap around a portion of the spray boom 180.

The extension member 140 may also define a variety of shapes and sizes. In some embodiments, the extension member 140 may be substantially straight as shown in FIGS. 4A, 6A, 7, and 9C (e.g., extend along a substantially straight line such as axis 149 in FIG. 4A). In other embodiments, the extension member 140 may define at least one curve as shown in FIG. 8B (e.g., not extend along a substantially straight line such as axis). The curve may be described as diverging from a straight line defined by an original trajectory of the extension member 140. In some embodiments, the curve of the extension member 140 may be configured to position the sprayer apparatus 100 with respect to a particular elongate boom and/or allow for desired storage of the spray hoods when an elongate boom is folded into a storage position.

The exemplary sprayer system 1 may include a plurality of different mounting apparatuses 120. For example, different mounting apparatuses 120 are shown in FIGS. 3, 7, 8B, 9C. Each of the plurality of different mounting apparatuses 120 may be configured to be coupled to a corresponding elongate boom 110 of a plurality of different elongate booms as shown in FIGS. 3, 8A, 9A, 9B, e.g., to retrofit the exemplary sprayer apparatus and systems to the elongate booms 110. Further, the plurality of different mounting apparatuses 120 may be configured to be removably coupled to the same or different extension members 140 to support the spray boom 180 and the spray hood 160 above a ground surface. For example, each mounting apparatus 120 of the plurality of different mounting apparatuses may be configured to allow the extension member 140 to be coupled thereto or decoupled therefrom while the mounting apparatus 120 is still coupled to the corresponding elongate boom 110.

The exemplary sprayer system 1 may further include a plurality of different extension members 140 as shown in FIGS. 3, 7, 8B, 9C. Each extension member 140 of the plurality of different extension members may be configured to be coupled to at least one mounting apparatus 120 of the plurality of different mounting apparatuses.

Figure 7:
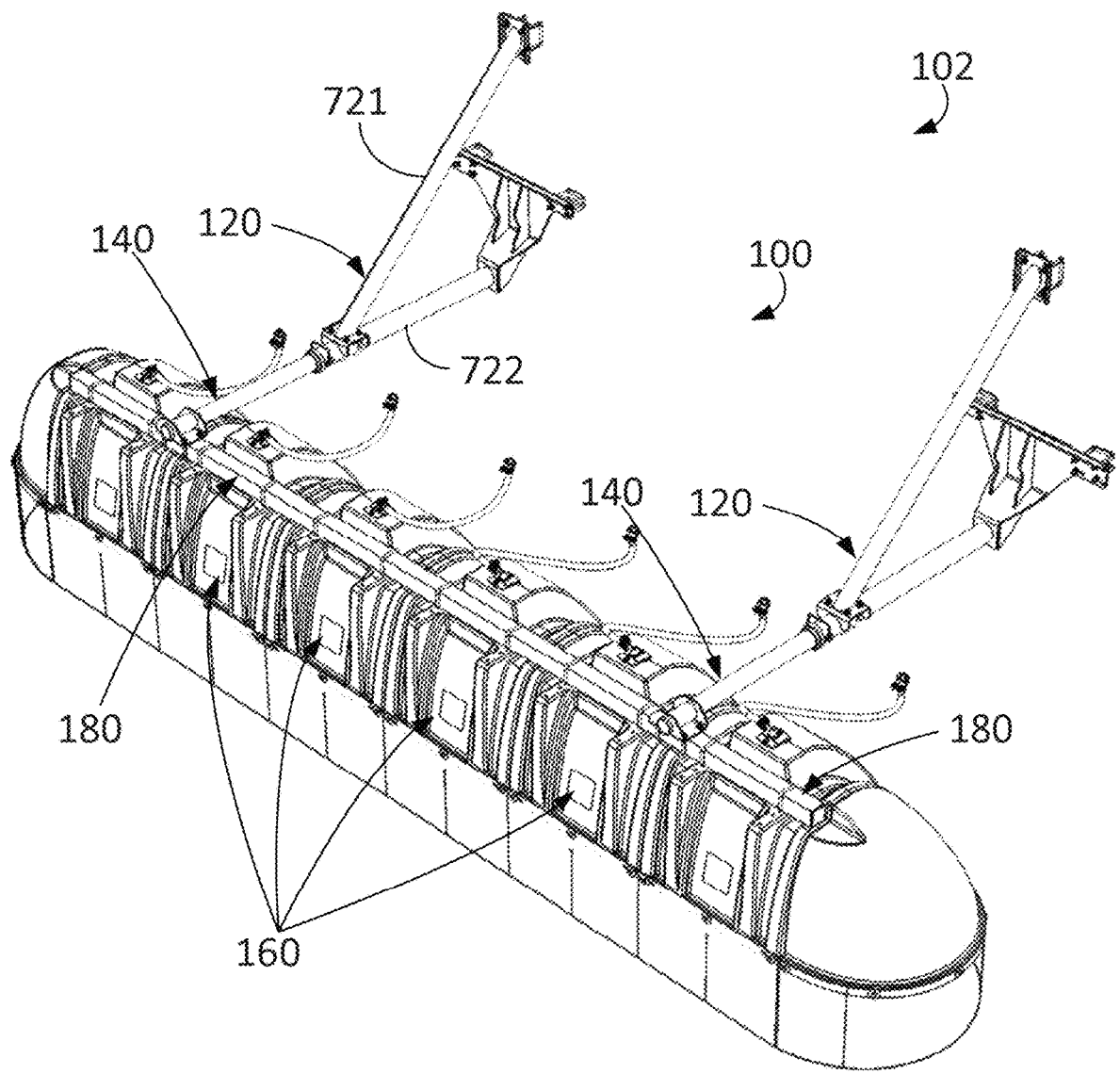
FIG. 7 is a perspective view of another portion of the system of FIG. 2 including the sprayer apparatus.
Figure 8B:
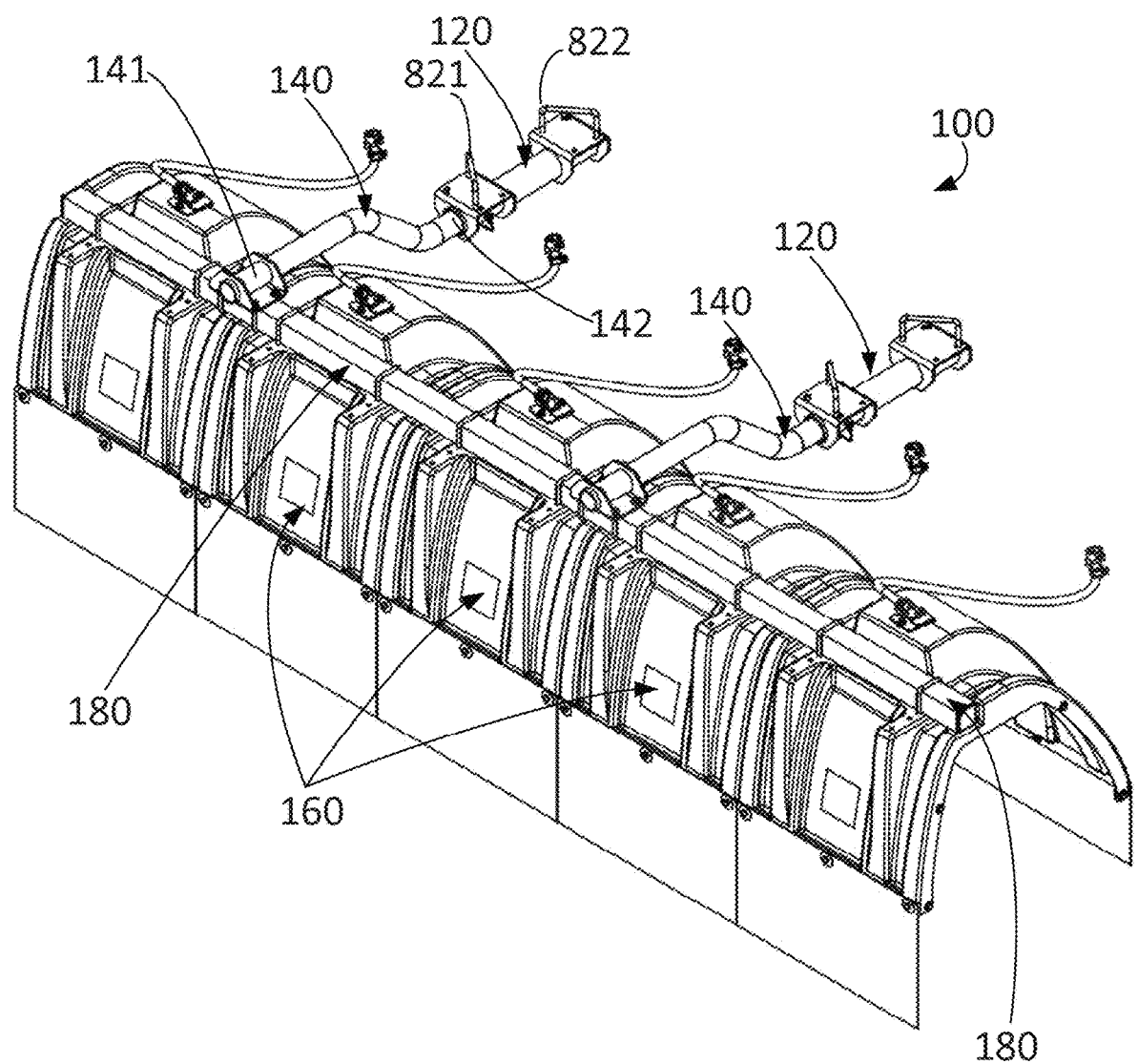
FIG. 8B is a perspective view of a portion of the system of FIG. 8A including the sprayer apparatus.

A perspective view of second section 102 of the system 1 of FIG. 2 including sprayer apparatus 100 is shown in FIG. 7. The sprayer apparatus 100 of the second section 102 may include a mounting apparatus 120 that includes a first mounting member 721 and a second mounting member 722. As shown, the first mounting member 721 may be positioned, or placed, at an angle to the second mounting member 722. Each of the first and second mounting members 721, 722 may be configured to be coupled to a different portion of an elongate boom, a frame structure, etc., e.g., to retrofit the sprayer apparatus 100 to the elongate boom and/or another structure configured for use in spraying a field. The first and second mounting members 721, 722 may be coupled to the elongate boom, a frame structure, etc. using, e.g., an adhesive, welding, one or more fasteners, etc.

The exemplary sprayer apparatus and systems may be used with a plurality of different elongate booms. The plurality of different elongate booms may be different lengths, different sizes, different construction, different geometry, different number of portions, etc. To couple the exemplary sprayer apparatus to each of the plurality of different elongate booms, the exemplary systems may include a plurality of different mounting apparatuses and/or extension members configured for each of the different elongate booms. For example, a specific, or particular, mounting apparatus and/or extension member may correspond to a specific, or particular, elongate boom. Two different sprayer apparatus systems configured to retrofit sprayer apparatus to two different elongate booms are depicted in FIGS. 8-9.

A perspective view of another exemplary system 2 for use in retrofitting sprayer apparatus 100 to another elongate boom 113 is shown in FIGS. 8A-8B. As shown, the exemplary mounting apparatus 120 may include a first mounting member 821 and a second mounting member 822. The first and second mounting members 821, 822 may be configured to be coupled to at least a portion of an elongate boom 113, e.g., to retrofit the sprayer apparatus 100 to the elongate boom 113. The first and second mounting members 821, 822 may be positioned at a diagonal with respect to the extension members 140 to increase contact area with the elongate boom 113. The first and second mounting members 821, 822 may be coupled to the elongate boom 113 using, e.g., an adhesive, welding, one or more fasteners, etc. As shown, the first and second mounting members 821, 822 are coupled to the elongate boom 113 using one or more U-shaped fasteners that may wrap around a portion of the elongate boom 113. Further, as shown, the elongate boom 113 may be coupled proximate a top portion of the first and second mounting members 821, 822. Additionally, an extension member 140, as shown in FIG. 8B, curves toward a ground surface as the extension member 140 extends from the spray hood region 141 of the extension member 140 to the mount end region 142 of the extension member 140.

Figure 9A:
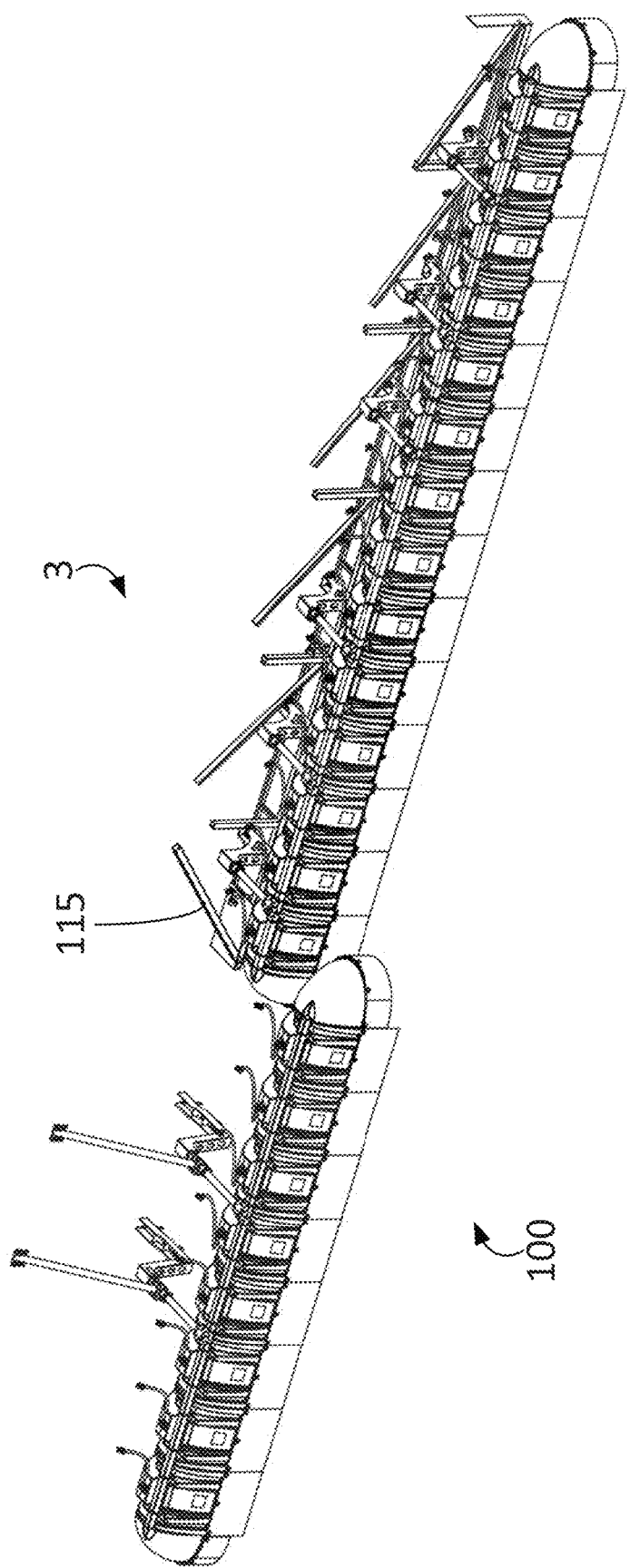
FIG. 9A is a rear perspective view of another exemplary system for use in retrofitting sprayer apparatus to another elongate boom.
Figure 9B:
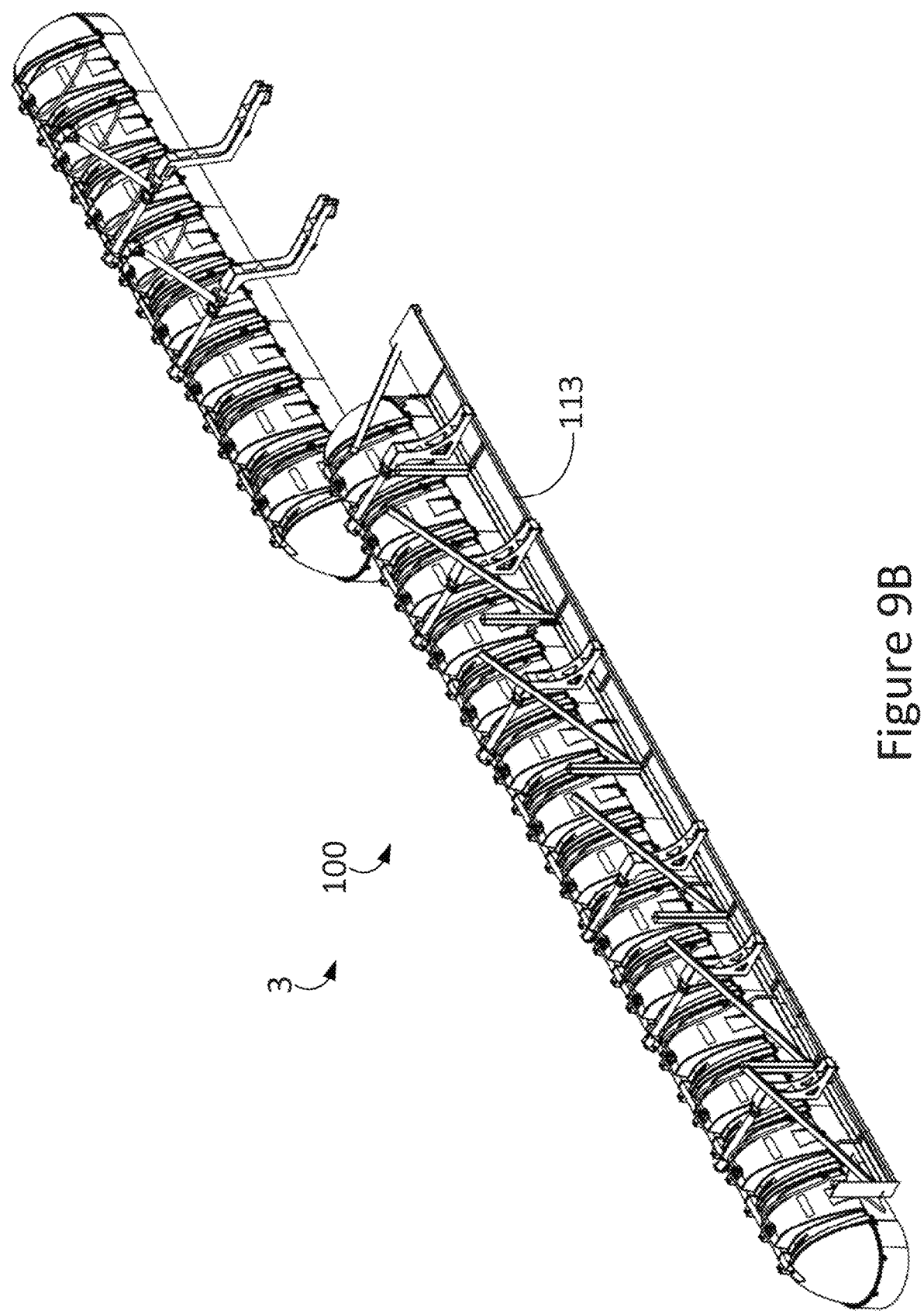
FIG. 9B is a front perspective view of the sprayer apparatus of the system of FIG. 9A.
Figure 9C:
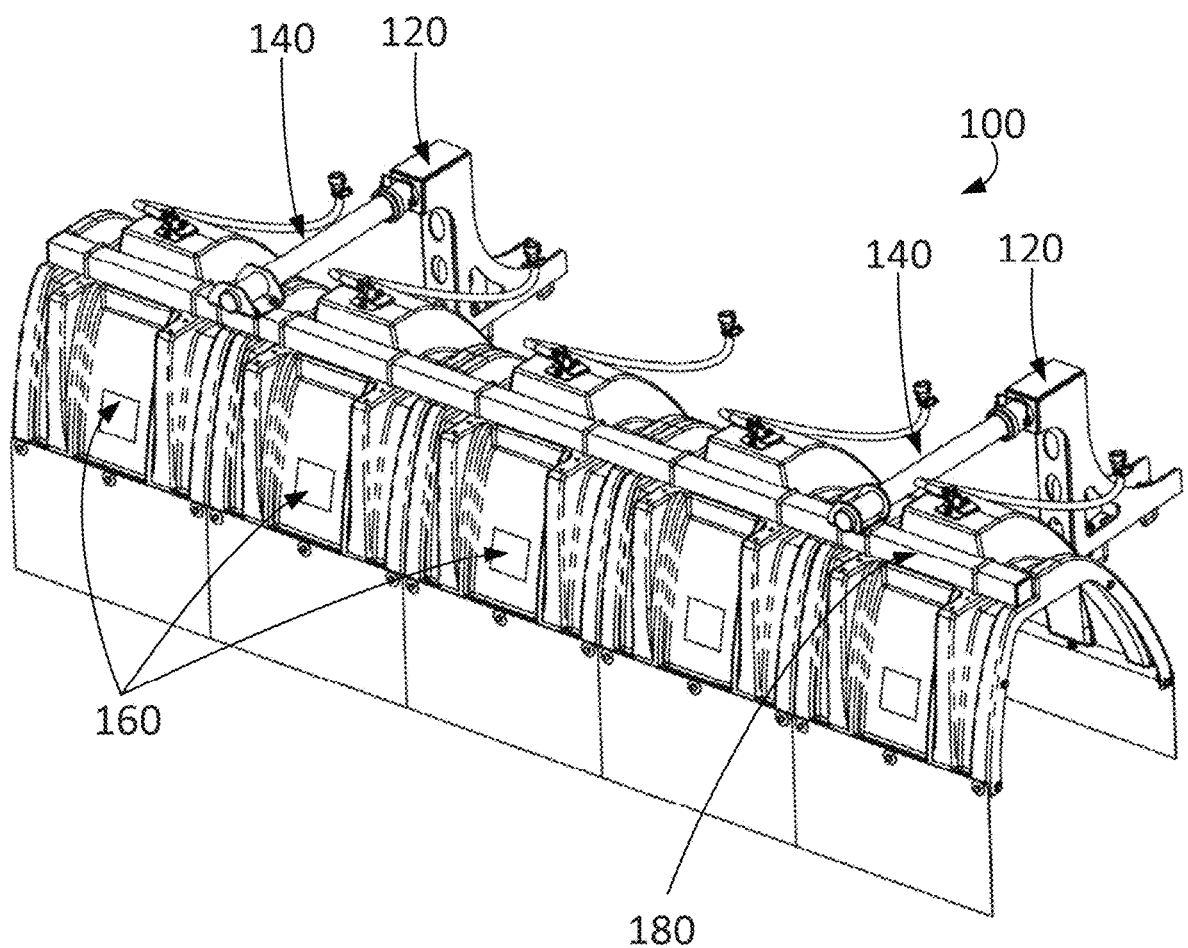
FIG. 9C is a rear perspective view of the sprayer apparatus of the system of FIG. 9A.

A front perspective view and a rear perspective view of another exemplary system 3 for use in retrofitting sprayer apparatus 100 to another elongate boom 115 is shown in FIGS. 9A-9C. The sprayer apparatus 100 may include a mounting apparatus 120 that is configured to be coupled to an elongate boom 115, e.g., to retrofit the sprayer apparatus 100 to the elongate boom 115. As shown, the mounting apparatus 120 is coupled to the extension member 140 proximate a higher point, in relation to a ground surface, than the mounting apparatus 120 is coupled to the elongate boom 115. In one or more embodiments, the mounting apparatus 120 may be coupled to the extension member 140 even with or proximate a lower point, in relation to a ground surface, than the mounting apparatus 120 is coupled to the elongate boom 115. The mounting apparatus 120 may be coupled to the elongate boom 115 using, e.g., an adhesive, welding, one or more fasteners, etc. As shown, the mounting apparatus 120 is coupled to the elongate boom 115 using one or more U-shaped fasteners that may wrap around a portion of the elongate boom 115. Further, as shown, the elongate boom 115 may be coupled proximate a bottom portion of the mounting apparatus 120.

The forgoing description, accompanied by drawings that form a part of the description hereof, show illustrations of various embodiments. It is to be understood that other embodiments are contemplated and may be made without departing from the scope of the present disclosure. The detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Particular materials and dimensions thereof recited in the disclosed examples, as well as other conditions and details, should not be construed to unduly limit this disclosure. Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A method of retrofitting a sprayer apparatus to a tractor via a mounting apparatus of the tractor, the method comprising:

coupling an extension member to the mounting apparatus by inserting a portion of the extension member into an attachment aperture defined by the mounting apparatus, wherein the extension member extends from a spray hood region to a mount end region, wherein the mounting apparatus comprises at least one bracket and a fastener, wherein the extension member is coupled to a spray boom and the spray boom is coupled to a plurality of spray hoods, wherein the attachment aperture faces the spray boom when coupling the extension member to the mounting apparatus, wherein each spray hood of the plurality of spray hoods extends from a first end to a second end along an axis defined by the spray boom and defines an outer surface and an inner surface, wherein the inner surface defines a channel extending from the first end to the second end, wherein the plurality of spray hoods are configured to spray a liquid onto foliage on a ground surface, wherein the extension member is configured to support the spray boom and the plurality of spray hoods above the ground surface when the extension member is coupled to the mounting apparatus; and removing the extension member from the mounting apparatus to remove the sprayer apparatus from the tractor.

2. The method of claim 1, wherein coupling an extension member to the mounting apparatus comprises sliding the extension member relative to the mounting apparatus along an extension axis of the extension member.

3. The method of claim 1, further comprising coupling an additional extension member to the mounting apparatus after removing the extension member from the mounting apparatus, wherein the additional extension member extends from a spray hood region to a mount end region, wherein the extension member is different than the additional extension member.

4. The method of claim 1, wherein the portion of the extension member inserted into the mounting apparatus defines a circular cross-sectional shape.

5. The method of claim 1, wherein coupling an extension member to the mounting apparatus comprises securing the extension member to the mounting apparatus using a pin extending through a sidewall of each of the extension member and the mounting apparatus.

6. The method of claim 1, wherein the spray boom is parallel to a portion of the extension member coupled to the mounting apparatus.

7. The method claim 1, wherein the spray hood region of the extension member is coupled to the spray boom and the mount end region is removably couplable to the tractor via the mounting apparatus.

8. A method of retrofitting a sprayer apparatus to a tractor via a mounting apparatus of the tractor, the method comprising:

coupling an extension member to the mounting apparatus, wherein coupling the extension member to the mounting apparatus comprises inserting a portion of the extension member into an attachment aperture defined by the mounting apparatus, wherein the extension member is coupled to a spray boom and the spray boom is coupled to a plurality of spray hoods, wherein each spray hood of the plurality of spray hoods extends from a first end to a second end along an axis defined by the spray boom and defines an outer surface and an inner surface, wherein the inner surface defines a channel extending from the first end to the second end, wherein the spray hood is configured to spray a liquid onto foliage on a ground surface, wherein the extension member is configured to support the spray boom and the plurality of spray hoods above the ground surface when the extension member is coupled to the mounting apparatus;

removing the extension member from the mounting apparatus to remove the sprayer apparatus from the tractor; and coupling an additional extension member to the mounting apparatus after removing the extension member from the mounting apparatus, wherein coupling the additional extension member to the mounting apparatus comprises inserting a portion of the additional extension member into the attachment aperture defined by the mounting apparatus, wherein the extension member is different than the additional extension member.

* * * * *